(12) United States Patent
Ueda

(10) Patent No.: US 8,990,291 B2
(45) Date of Patent: Mar. 24, 2015

(54) INFORMATION PROCESSING APPARATUS, SERVER-CLIENT SYSTEM, AND COMPUTER PROGRAM PRODUCT

(75) Inventor: Tomoaki Ueda, Kyoto (JP)

(73) Assignee: Empire Technology Development LLC, Wilmington, DE (US)

( * ) Notice: Subject to any disclaimer, the term of this patent is extended or adjusted under 35 U.S.C. 154(b) by 597 days.

(21) Appl. No.: 12/993,465

(22) PCT Filed: Jul. 21, 2010

(86) PCT No.: PCT/JP2010/004683
§ 371 (c)(1),
(2), (4) Date: Nov. 18, 2010

(87) PCT Pub. No.: WO2012/011151
PCT Pub. Date: Jan. 26, 2012

(65) Prior Publication Data
US 2012/0023156 A1    Jan. 26, 2012

(51) Int. Cl.
*G06F 13/00*    (2006.01)
*H04L 29/08*    (2006.01)

(52) U.S. Cl.
CPC .................. *H04L 67/02* (2013.01); *H04L 67/22* (2013.01)
USPC ........................................................ 709/203

(58) Field of Classification Search
CPC ............................... H04L 67/02; H04L 67/22
USPC ............. 709/203, 217, 219, 224; 707/999.01, 707/711; 715/234–235
See application file for complete search history.

(56) References Cited

U.S. PATENT DOCUMENTS

| | | | | |
|---|---|---|---|---|
| 5,796,952 A | * | 8/1998 | Davis et al. | 709/224 |
| 6,021,426 A | * | 2/2000 | Douglis et al. | 709/200 |
| 6,088,707 A | * | 7/2000 | Bates et al. | 715/235 |
| 6,112,240 A | * | 8/2000 | Pogue et al. | 709/224 |
| 6,973,492 B2 | * | 12/2005 | Streble | 709/224 |
| 7,216,149 B1 | | 5/2007 | Briscoe et al. | |

(Continued)

FOREIGN PATENT DOCUMENTS

| | | |
|---|---|---|
| CA | 2518109 A1 | 9/2004 |
| CN | 1768368 A | 5/2006 |

(Continued)

OTHER PUBLICATIONS

Richard M. Smith, "The Web Bug FAQ", Nov. 11, 1999, Version 1.0, 5 pages.*

(Continued)

*Primary Examiner* — Brian J Gillis
*Assistant Examiner* — Amy Ling
(74) *Attorney, Agent, or Firm* — Brundidge & Stanger, P.C.

(57) ABSTRACT

In a server-client system, a server provides a Web site and a function to record access logs using Web beacon technology, and a client terminal communicable with the server includes a browser to execute JavaScript by dynamically embedding a 1-pixel image file that is dynamically added with a random parameter to a source of a <img> tag element in a <div> tag element. The random parameter may include at least current time data acquired in the client terminal. The server may read the requested 1-pixel image file from the Web site, and transfer the 1-pixel image file in HTML to the client terminal, and concurrently record a log including the random parameter in addition to information recordable by the Web beacon technology.

16 Claims, 20 Drawing Sheets

(56) References Cited

U.S. PATENT DOCUMENTS

| | | | |
|---|---|---|---|
| 7,278,132 B2 * | 10/2007 | Pelegri-Llopart et al. | 717/115 |
| 7,562,291 B2 * | 7/2009 | Ong | 715/229 |
| 7,685,191 B1 | 3/2010 | Zwicky et al. | |
| RE41,440 E * | 7/2010 | Briscoe et al. | 709/217 |
| 7,752,261 B1 * | 7/2010 | Nalam | 709/203 |
| 7,958,191 B1 * | 6/2011 | Nalam | 709/203 |
| 8,112,482 B1 * | 2/2012 | Geddes | 709/206 |
| 8,196,048 B2 * | 6/2012 | Error et al. | 715/738 |
| 8,239,522 B1 * | 8/2012 | Luby et al. | 709/224 |
| 8,341,247 B2 * | 12/2012 | Shkedi | 709/219 |
| 8,595,634 B2 * | 11/2013 | Schneider et al. | 715/760 |
| 2004/0098229 A1 * | 5/2004 | Error et al. | 702/186 |
| 2004/0122943 A1 * | 6/2004 | Error et al. | 709/224 |
| 2004/0243704 A1 * | 12/2004 | Botelho et al. | 709/224 |
| 2004/0254942 A1 * | 12/2004 | Error et al. | 707/100 |
| 2006/0026438 A1 * | 2/2006 | Stern et al. | 713/184 |
| 2006/0149746 A1 | 7/2006 | Bansod et al. | |
| 2006/0167981 A1 | 7/2006 | Bansod et al. | |
| 2006/0248169 A1 * | 11/2006 | Matsutsuka et al. | 709/219 |
| 2007/0005762 A1 * | 1/2007 | Knox et al. | 709/224 |
| 2008/0250136 A1 * | 10/2008 | Izrailevsky et al. | 709/224 |
| 2009/0144640 A1 | 6/2009 | Schneider et al. | |
| 2009/0164614 A1 * | 6/2009 | Christian et al. | 709/223 |
| 2009/0240703 A1 | 9/2009 | Yoshino | |
| 2010/0251144 A1 * | 9/2010 | Shaty | 715/760 |
| 2011/0093461 A1 * | 4/2011 | Mui et al. | 707/736 |
| 2012/0036119 A1 * | 2/2012 | Zwicky et al. | 707/711 |
| 2012/0117641 A1 * | 5/2012 | Holloway et al. | 726/12 |
| 2014/0223329 A1 * | 8/2014 | Falaki et al. | 715/747 |

FOREIGN PATENT DOCUMENTS

| | | |
|---|---|---|
| JP | 2005-020432 A | 1/2005 |
| JP | 3744255 | 2/2006 |
| JP | 2006-195979 | 7/2006 |
| JP | 3849919 | 11/2006 |
| JP | 3938141 | 6/2007 |
| JP | 4046328 | 2/2008 |
| JP | 4090494 | 5/2008 |
| JP | 2008-546103 A | 12/2008 |
| JP | 4236689 | 3/2009 |
| WO | WO 98/43380 | 10/1998 |
| WO | WO 2006/133105 A2 | 12/2006 |
| WO | WO 2009/085669 A2 | 7/2009 |

OTHER PUBLICATIONS

Dynamic Draw Professional http://www.vector.co.jp/magazine/softnews/060511/n0605111.html.

"Web Beacons," Last updated on Dec. 2, 2011, accessed at http://ja.wikipedia.org/wiki/%E3%82%A6%E3%82%A7%E3%83%-96%E3%83%93%E3%83%BC%E3%82%B3%E3%83%B3 (English Translation), pp. 2.

International Search Report and Written Opinion for International Application No. PCT/JP2010/004683 mailed on Oct. 19, 2010.

"Debugging, monitoring," ekouhou.net accessed at http://www.ekouhou.net/disp-fterm-5B042MC40-p8.html accessed on Jul. 13, 2012, pp. 9, dated Jun. 22, 2010.

* cited by examiner

Fig. 7

| IP ADDRESS | DOMAIN NAME OR SUB-DOMAIN NAME | CURRENT TIME | TAG INFORMATION |
|---|---|---|---|
| 221.28.158.155 | softbank221028158155.bbtec.net | -- [31/May/2010:00:00:32 +0900] | "GET /b/p.gif?content=Mukade&dummy=12752316631448&MovieID=PrMDZiHnaLs&TimeCount=186 |
| 221.28.158.155 | softbank221028158155.bbtec.net | -- [31/May/2010:00:01:33 +0900] | "GET /b/p.gif?content=Mukade&dummy=12752317231608&MovieID=PrMDZiHnaLs&TimeCount=187 |
| 221.28.158.155 | softbank221028158155.bbtec.net | -- [31/May/2010:00:02:32 +0900] | "GET /b/p.gif?content=Mukade&dummy=12752317831788&MovieID=PrMDZiHnaLs&TimeCount=188 |
| 125.2.92.215 | ntttkyo427215.tkyo.nt.ftth.ppp.infoweb.ne.jp | -- [31/May/2010:00:02:42 +0900] | "GET /b/p.gif?content=Mukade&dummy=12752317792408&MovieID=efgDZKd9N9w&TimeCount=0 |
| 221.28.158.155 | softbank221028158155.bbtec.net | -- [31/May/2010:00:03:32 +0900] | "GET /b/p.gif?content=Mukade&dummy=12752318431938&MovieID=PrMDZiHnaLs&TimeCount=189 |
| 133.41.75.37 | 2229.c.hiroshima-u.ac.jp | -- [31/May/2010:00:03:55 +0900] | "GET /b/p.gif?version=0-0-97&dummy=12752318355318&tour=10&movie=34 |
| 221.28.158.155 | softbank221028158155.bbtec.net | -- [31/May/2010:00:04:32 +0900] | "GET /b/p.gif?content=Mukade&dummy=12752319031998&MovieID=PrMDZiHnaLs&TimeCount=190 |
| 211.125.138.166 | gatekeeper51.sony.co.jp | -- [31/May/2010:00:05:02 +0900] | "GET /b/p.gif?version=0-0-97&dummy=12752318811978&tour=10&movie=41 |
| 221.28.158.155 | softbank221028158155.bbtec.net | -- [31/May/2010:00:05:32 +0900] | "GET /b/p.gif?content=Mukade&dummy=12752319632178&MovieID=PrMDZiHnaLs&TimeCount=191 |
| 221.28.158.155 | softbank221028158155.bbtec.net | -- [31/May/2010:00:06:32 +0900] | "GET /b/p.gif?content=Mukade&dummy=12752320232258&MovieID=PrMDZiHnaLs&TimeCount=192 |
| 220.19.250.209 | softbank220019250209.bbtec.net | -- [31/May/2010:00:07:03 +0900] | "GET /b/p.gif?content=Mukade&dummy=12752320412968&MovieID=7aPly5F6hsA&TimeCount=0 |
| 219.127.248.142 | 219.127.248.142 | -- [31/May/2010:00:07:09 +0900] | "GET /b/p.gif?content=Mukade&dummy=12752320496878&MovieID=UJ01FhyHly4&TimeCount=0 |
| 221.28.158.155 | softbank221028158155.bbtec.net | -- [31/May/2010:00:07:32 +0900] | "GET /b/p.gif?content=Mukade&dummy=12752320832478&MovieID=PrMDZiHnaLs&TimeCount=193 |
| 220.19.250.209 | softbank220019250209.bbtec.net | -- [31/May/2010:00:08:03 +0900] | "GET /b/p.gif?content=Mukade&dummy=12752321013128&MovieID=7aPly5F6hsA&TimeCount=1 |
| 221.28.158.155 | softbank221028158155.bbtec.net | -- [31/May/2010:00:08:32 +0900] | "GET /b/p.gif?content=Mukade&dummy=12752321432618&MovieID=PrMDZiHnaLs&TimeCount=194 |
| 220.19.250.209 | softbank220019250209.bbtec.net | -- [31/May/2010:00:09:03 +0900] | "GET /b/p.gif?content=Mukade&dummy=12752321613598&MovieID=7aPly5F6hsA&TimeCount=2 |
| 221.28.158.155 | softbank221028158155.bbtec.net | -- [31/May/2010:00:09:32 +0900] | "GET /b/p.gif?content=Mukade&dummy=12752322032678&MovieID=PrMDZiHnaLs&TimeCount=195 |
| 221.28.158.155 | softbank221028158155.bbtec.net | -- [31/May/2010:00:10:32 +0900] | "GET /b/p.gif?content=Mukade&dummy=12752322632798&MovieID=PrMDZiHnaLs&TimeCount=196 |
| 221.28.158.155 | softbank221028158155.bbtec.net | -- [31/May/2010:00:11:32 +0900] | "GET /b/p.gif?content=Mukade&dummy=12752322233028&MovieID=PrMDZiHnaLs&TimeCount=197 |
| 221.28.158.155 | softbank221028158155.bbtec.net | -- [31/May/2010:00:12:32 +0900] | "GET /b/p.gif?content=Mukade&dummy=12752322833148&MovieID=PrMDZiHnaLs&TimeCount=198 |
| 221.28.158.155 | softbank221028158155.bbtec.net | -- [31/May/2010:00:13:32 +0900] | "GET /b/p.gif?content=Mukade&dummy=12752324433248&MovieID=PrMDZiHnaLs&TimeCount=199 |
| 221.28.158.155 | softbank221028158155.bbtec.net | -- [31/May/2010:00:14:32 +0900] | "GET /b/p.gif?content=Mukade&dummy=12752325033348&MovieID=PrMDZiHnaLs&TimeCount=200 |
| 221.28.158.155 | softbank221028158155.bbtec.net | -- [31/May/2010:00:15:32 +0900] | "GET /b/p.gif?content=Mukade&dummy=12752325633608&MovieID=PrMDZiHnaLs&TimeCount=201 |
| 122.251.226.7 | fwya226007.c-able.ne.jp | -- [31/May/2010:00:15:38 +0900] | "GET /b/p.gif?content=Mukade&dummy=12752326324388&MovieID=Lwkbfo5kSfg&TimeCount=0 |
| 221.28.158.155 | softbank221028158155.bbtec.net | -- [31/May/2010:00:16:32 +0900] | "GET /b/p.gif?content=Mukade&dummy=12752326236648&MovieID=PrMDZiHnaLs&TimeCount=202 |
| 122.251.226.7 | fwya226007.c-able.ne.jp | -- [31/May/2010:00:16:38 +0900] | "GET /b/p.gif?content=Mukade&dummy=12752326924258&MovieID=Lwkbfo5kSfg&TimeCount=1 |

```
var playlist = [ "num": 3, "width": "280", "height": "230", "tour": [
{ "name": "tour1", "tour_name": "ちびミク", "width": "60px", "time_length": 277000, "upload_date": "2009/04/03", "title": "[MikuMikuDance]LOVE & JOY 4 (ちびミク&初音ミク)", "comment": "あれ？ 物理エンジン使って作った動画? 完璧に壁に張り付いて重力のシミュレーションができている。 これがもし手動だったら神業だ。 表情もいい。 目線とか仕草って子供っぽくよく表現できている。" },
{ "movie_id": "Vvmq67lBxbk", "time_length": 303000, "upload_date": "2009/03/25", "title": "[MikuMikuDance]Chibi-Miku Movie (ちびミク)お披露目動画", "comment": "ミクちゃんのお披露目動画らしい。娘を持つ親の気持ちが完璧に表現できてる動画だ。[2/4]子供の表情がよく出てる。[3/4]これでも演歌にも対応か…。" },
{ "movie_id": "4xjRxhpHtIM", "time_length": 70000, "upload_date": "2009/04/17", "title": "[MikuMikuDance]ちびミクちゃんいらりんしゃ[パパ撮ってー～](ちびミク)", "comment": "これは…一輪車。この発想が楽しいなあ。光源処理の関係かパい空が惜しいのが惜しいかも。" },
{ "movie_id": "zA7N5XYuU0", "time_length": 105000, "upload_date": "2009/04/17", "title": "[MikuMikuDance]ののウさんとちびミクでVOC@LOIDを踊らせてみた（ちびミク）", "comment": "" },
{ "movie_id": "2mEwhiolf6k", "time_length": 266000, "upload_date": "2009/04/19", "title": "[MikuMikuDance]LOVE & JOY 5 (ちび化プログラム?)", "comment": "たった2週間で手作業でこれを全部ちびたけ化したとは恐れ入る、ちび化プログラムを開発したのだろうね。ちび化するモデル変形比率を押さえたのかな？ それにしてもみんな見事に低年齢化している。そのうちスリーサイズ変更、性別変更までできればいいな。でも高齢化プログラムはできればはやめてほしいな。" },
{ "movie_id": "gNvn8OR6nLY", "time_length": 320000, "upload_date": "2009/01/24", "title": "[MikuMikuDance]LOVE & JOY On stage (PV style)", "comment": "" }
] },
{ "name": "tour2", "tour_name": "歌和サクラ", "width": "75px", "count": 6, "movie_data": [
{ "movie_id": "Nqde607KE0", "time_length": 311000, "upload_date": "2008/05/01", "title": "[ファインダー]song by 歌和サクラ", "comment": "ディジタル音源が初音ミクを使って作られたオリジナル曲のカバーを歌う謎の女性シンガー。1) 東京都在住の学生。2) お姉さんに歌を教えてもらった。3) 両親が音楽関係者。4) 機材はMacのみ。5) 動画を作ってアップロードしていることは両親も知らない。程度の情報しか公表されていない。デザインセンスも見ての通りかなりのレベルだ。安室奈美恵やや多田カルを連想させるハスキーボイスが特徴だ。まず最初の曲は「ファインダー」。" },
{ "movie_id": "A6PIfpbK4Ew", "time_length": 347000, "upload_date": "2008/01/21", "title": "[ストロボナイツ]を歌ってみました by 歌和サクラ", "comment": "曲名「ストロボナイツ」。" },
{ "movie_id": "U7LL9ad-ns", "time_length": 227000, "upload_date": "2008/11/12", "title": "[Monochroact]by 歌和サクラ", "comment": "曲名『モノクロアクト Monochroact』。" },
{ "movie_id": "RhsYMk8mqk8", "time_length": 265000, "upload_date": "2008/02/21", "title": "[メルト]-Band Edition- by 歌和サクラ", "comment": "曲名『メルト』-Band Edition- ニコニコ動画で満を持して放たれたカテゴリーキラーに次々とカバー動画で人気のコスプレディッシュボックスを追いているこれからもブームを巻き起こしたディッシュ・エディションに歌和サクラさんの歌も加えたバージョンを投稿された、大人気となった。「唯一のベース演奏は非常に安定感があり、これを見て惜しんだ人は多く、実は右手のコスプレ性別は『噂』と決まっているが、性別には男性だが、このバンド・エディ" },
{ "movie_id": "XjORrmvgFO8", "time_length": 2700000, "upload_date": "2008/04/05", "title": "[Dear song] by 歌和サクラ", "comment": "写真は都庁が写りこんでいるので新宿付近で秋ごろ撮影されたものと思われる。" },
{ "movie_id": "WtszKuAQzao", "time_length": 90000, "upload_date": "2008/05/04", "title": "[みんくみくにしてあげる] by 歌和サクラ", "comment": "「みんくみくにしてあげる」" }
] },
{ "name": "tour3", "tour_name": "咲音メイコ", "width": "75px", "count": 7, "movie_data": [
{ "movie_id": "JHeybe7lMO", "time_length": 155000, "upload_date": "2009/04/24", "title": "[MikuMikuDance]恋のフーガ(Dance Shot PV)", "comment": "ダブル メイコの魅力!?" },
{ "movie_id": "GwGiv2Ma1uM", "time_length": 216000, "upload_date": "2008/08/14", "title": "[MikuMikuDance]王心凌 HONEY[日本語カバー]", "comment": "" },
{ "movie_id": "r2655bnP2wl", "time_length": 290000, "upload_date": "2009/01/22", "title": "[MikuMikuDance]Be myself[咲音メイコ]", "comment": "" },
{ "movie_id": "Fz6VGxauN18", "time_length": 133000, "upload_date": "2008/12/24", "title": "[MikuMikuDance]エージェント夜を往く[咲音メイコ]", "comment": "" },
{ "movie_id": "mdFTMOBzn9Y", "time_length": 125000, "upload_date": "2008/11/28", "title": "[MikuMikuDance]Do-Dai[咲音メイコ]", "comment": "" },
{ "movie_id": "rdlS0z-LA38", "time_length": 217000, "upload_date": "2008/11/25", "title": "[MikuMikuDance]Honey[咲音メイコ]", "comment": "" },
{ "movie_id": "5_wJNdefO4", "time_length": 290000, "upload_date": "2009/01/08", "title": "[MikuMikuDance]Be myself[咲音メイコ]", "comment": "" }
] }
];
```

```
var img_tag = "<a title=¥"" + playlist.tour[bgm_tour].movie_data[i].title + "¥"¥"><input type=¥"image¥"
src=¥"http://i1.ytimg.com/vi/" + playlist.tour[bgm_tour].movie_data[i].movie_id + "/default.jpg¥"
width=¥"90px" ¥"height=¥"70px" ¥"onclick=¥"changeMovie(" + i + ")¥;(¥" /></a>";
```

Fig. 15

```
function SendInfo() {
  bgm_stim= new Date().getTime(); // Acquire current time and use if in place of random number.
  var sMark = "<img src=¥"b/p.gif?version=v0r95&dummy=" + bgm_stim + "&tour=" + bgm_tour + "&movie=" +
  bgm_num +"¥">"; document.GetById("SendMsg").innerHTML=sMark; // Dynamically write img tag within div tag
  added with ID called Beacon.
}
```

501 — 502 — 505 — 503 — "GET 506
160.15.13.176|group176.tottori-u.ac.jp|- -|[31/Aug/2009:23:29:56 +0900]|"GET|=10|&|movie=0|HTTP/1.1" 200 799 "http://www.neo-tech-lab.co.uk/index.htm" 504
/b/p.gif?version=v0r95&|dummy=1251728996834|&|tour=10|&|movie=0|HTTP/1.1" 200 799
502 — 133.48.76.19|nano01.nips.ac.jp|- -|[31/Aug/2009:23:30:07 +0900]|"GET 503 "GET 506
505 — /b/p.gif?version=v0r95&|dummy=1251729015229|&|tour=2|&|movie=7|HTTP/1.1" 200 799 507
"http://74.125.153.132/search?q=cache:c2WIL8iEKgkJ:www.neo-tech-lab.co.uk/AnalogCircuitBasic1.htm+%E8%84%B3%E6%B3%A2%E3%80%80%E3%82%AA%E3%83%9A%E3%83%AC%E3%83%BC%E3%82%A2E3%83%B3%E3%83%97&cd=26&hl=ja&ct=clnk&gl=jp&client=firefox-a"

501 — 218.226.144.236|eatkyo215236.adsl.ppp.infoweb.ne.jp|- -|[31/Aug/2009:23:31:18 +0900] "GET
/b/p.gif?version=v0r95&dummy=1251729078937&tour=2&movie=5 HTTP/1.1" 200 799 "http://www.neo-tech-lab.co.uk/AnalogCircuitBasic1.htm"

501 — 133.48.76.19|nano01.nips.ac.jp|- -|[31/Aug/2009:23:31:40 +0900] "GET
/b/p.gif?version=v0r95&dummy=1251729108227&tour=2&movie=0 HTTP/1.1" 200 799 "http://74.125.153.132/search?q=cache:c2WIL8iEKgkJ:www.neo-tech-lab.co.uk/AnalogCircuitBasic1.htm+%E8%84%B3%E6%B3%A2%E3%80%80%E3%82%AA%E3%83%9A%E3%83%AC%E3%83%BC%E3%82%A2E3%83%B3%E3%83%97&cd=26&hl=ja&ct=clnk&gl=jp&client=firefox-a"

501 — 160.15.13.176|group176.tottori-u.ac.jp|- -|[31/Aug/2009:23:34:37 +0900] "GET
/b/p.gif?version=v0r95&dummy=1251729277850&tour=10&movie=11 HTTP/1.1" 200 799 "http://www.neo-tech-lab.co.uk/index.htm"

501 — 218.226.144.236|eatkyo215236.adsl.ppp.infoweb.ne.jp|- -|[31/Aug/2009:23:36:34 +0900] "GET
/b/p.gif?version=v0r95&dummy=1251729395000&tour=2&movie=6 HTTP/1.1" 200 799 "http://www.neo-tech-lab.co.uk/AnalogCircuitBasic1.htm"

501 — 133.48.76.19|nano01.nips.ac.jp|- -|[31/Aug/2009:23:36:54 +0900] "GET
/b/p.gif?version=v0r95&dummy=1251729422311&tour=2&movie=1 HTTP/1.1" 200 799 "http://74.125.153.132/search?q=cache:c2WIL8iEKgkJ:www.neo-tech-lab.co.uk/AnalogCircuitBasic1.htm+%E8%84%B3%E6%B3%A2%E3%80%80%E3%82%AA%E3%83%9A%E3%83%AC%E3%83%BC%E3%82%A2E3%83%B3%E3%83%97&cd=26&hl=ja&ct=clnk&gl=jp&client=firefox-a"

501 — 160.15.13.176|group176.tottori-u.ac.jp|- -|[31/Aug/2009:23:40:12 +0900] "GET
/b/p.gif?version=v0r95&dummy=1251729612867&tour=10&movie=12 HTTP/1.1" 200 799 "http://www.neo-tech-lab.co.uk/index.htm"

501 — 80.165.130.108|0x50a5826c.boanxx17.dynamic.dsl.tele.dk|- -|[31/Aug/2009:23:40:33 +0900] "GET
/Panoramio/b/p.gif?version=v0r95&dummy=1251729567456&tour=14&movie=0 HTTP/1.1" 200 799 "http://www.neo-tech-lab.co.uk/Panoramio/"

501 — 218.226.144.236|eatkyo215236.adsl.ppp.infoweb.ne.jp|- -|[31/Aug/2009:23:40:54 +0900] "GET
/b/p.gif?version=v0r95&dummy=1251729655218&|tour=2|&|movie=7|HTTP/1.1" 200 799 "http://www.neo-tech-lab.co.uk/AnalogCircuitBasic1.htm" 506 507

501 — 218.226.144.236|eatkyo215236.adsl.ppp.infoweb.ne.jp|- -|[31/Aug/2009:23:42:27 +0900] "GET
/b/p.gif?version=v0r95&dummy=1251729784437&|tour=2|&|movie=0|HTTP/1.1" 200 799 "http://www.neo-tech-lab.co.uk/AnalogCircuitBasic1.htm" 506 507

INFORMATION PROCESSING APPARATUS, SERVER-CLIENT SYSTEM, AND COMPUTER PROGRAM PRODUCT

TECHNICAL FIELD

The disclosure generally relates to information processing apparatuses, server-client systems, and computer program products that may be suited for recording access logs and retrieving access logs.

BACKGROUND ART

A server-client system may be formed by a Web server and a client terminal that accesses a Web site provided by the Web server, via the Internet, for example. At the Web server, it may be useful to record a log of each access made to each Web page of the Web site from the client terminal. The Web beacon technology is an access analysis technique that has been proposed to record a log of when and who visited which Web page of the Web site provided by the Web server.

For example, the Web beacon technology embeds, with respect to each analyzing target Web page, a <img> tag in JavaScript that indicates an embedded image and causes a single-pixel image file for analysis to be read from the Web site. The <img> tag, that may be used in cross-domains, acts as a Web beacon. Information related to the visitors who visited the Web site may easily be analyzed by extracting the <img> tag element embedded in the Web page from the log of the access, and analyzing the log, which may involve counting or analyzing IP (Internet Protocol) addresses of the visitors included in the log. The single-pixel image file is used to avoid an unnecessary consumption of memory resources of the Web site and to avoid an unnecessary increase in the communication bandwidth, even if identical image files are embedded in different Web pages, for example.

But recently, a browser of the client terminal may have a caching function that uses cached data if a file has a file name or URL (Uniform Resource Locator) identical to that of the cached data. For this reason, a log of an access that uses the cached data and does not read data from the specified Web site will not be recorded.

Accordingly, a method has been proposed to nullify the caching function in order to always read the single-pixel image file from the specified Web site and positively record a log of the access made by a visitor (or user). According to this proposed method, a dynamically random parameter is added to a source of the <img> tag element, that is, to a file name of the single-pixel image file, in order to always intentionally cause an erroneous recognition of the single-pixel image file as being a new single-pixel image file and cause reading from the specified Web site. As a result, the log of the access is recorded each time the Web page of the specified Web site is accessed.

However, the Web beacon technology, even in combination with the proposed method, only records the log including information that enables an access statistic data to be obtained for each visited Web page of the specified Web site. An Apache HTTP (Hyper Text Transfer Protocol) server (Apache: Registered Trademark) has a function of recording a log of the access, including an IP address, a domain name, an access date and time (only in units of seconds or greater), an access page name, a referrer (that is, a page referred immediately prior to the access) and the like of the visitor. But even if the Web server is formed by the Apache HTTP server, for example, the log of the access only has a time resolution on the order of seconds. This time resolution on the order of seconds is relatively low when a human response speed, that is, a time required for a manual operation such as a mouse click to be made by the visitor at the client terminal, is taken into consideration. Furthermore, the log of the access is not recorded in an order of requests from the browser, but in an order of file transfer executions.

Consequently, the log recorded in the Web server does not store causality of operations associated with the access and made by the visitor, and does not necessarily accurately reflect the operations associated with the access made by the visitor.

SUMMARY

Accordingly, this disclosure generally describes example embodiments to provide a novel and useful information processing apparatus, server-client system, and computer program product, that may record a log of an access to a Web site so that the log stores causality of operations associated with the access and made by a visitor and accurately reflects such operations.

According to some example embodiments, there is provided an information processing apparatus communicable with a server that provides a Web site and includes a function of recording access logs using Web beacon technology, including a storage unit configured to store a browser program; and a processor configured to execute the browser program stored in the storage unit in order to provide a browser function, the browser function including a function to execute JavaScript by dynamically embedding a single-pixel image file that is dynamically added with a random parameter to a source of a <img> tag element in a <div> tag element, the random parameter including at least current time data acquired in the information processing apparatus; and a function to forward a request for the single-pixel image file to the server as an input event is generated in the information processing apparatus.

According to some example embodiments, there is provided an information processing apparatus communicable with a client terminal, including a storage unit configured to store a server program and a log; and a processor configured to execute the server program stored in the storage unit in order to provide a server function, the server function including a function to provide a Web site; a function to read a single-pixel image file from the Web site and to transfer the read single-pixel image file in HTML to the client terminal in response to a request for the single-pixel image file received responsive to an input event generated in the client terminal; and a function to record a log of the access made from the client terminal using Web beacon technology, substantially simultaneous to the transfer of the read single-pixel image file in HTML to the client terminal, wherein the request for the single-pixel image file received from the client terminal is dynamically embedded with the single-pixel image file that is dynamically added with a random parameter to a source of a <img> tag element in a <div> tag element by executing Java-Script, the random parameter includes at least current time data acquired in the client terminal, and the log includes the random parameter added to the single-pixel image file in the request for the single-pixel image file, in addition to information recordable by the Web beacon technology.

According to some example embodiments, there is provided a server-client system comprising the information processing apparatuses described above that function as a client terminal and a server, respectively.

According to some example embodiments, there is provided a computer program product that stores a program which, when executed by a computer, causes the computer to perform a browser function of the information processing apparatus described above that functions as a client terminal or, to perform a server function of the information processing apparatus described above that functions as a server.

Other objects and further features of the embodiments will be apparent from the following detailed description when read in conjunction with the accompanying drawings.

BRIEF DESCRIPTION OF DRAWINGS

FIG. 7 is a diagram illustrating an example of the access log recorded responsive to the timer event;

FIG. 13 is a diagram illustrating an example of the playlist of the JavaScript file;

FIG. 14 is a diagram illustrating an example of a dynamically generated tag;

FIG. 15 is a diagram illustrating an example of a SendInfo function;

FIG. 16 is a diagram illustrating an example of the access log including information related to input events generated at the client terminal;

DESCRIPTION OF EMBODIMENTS

Figure 1:
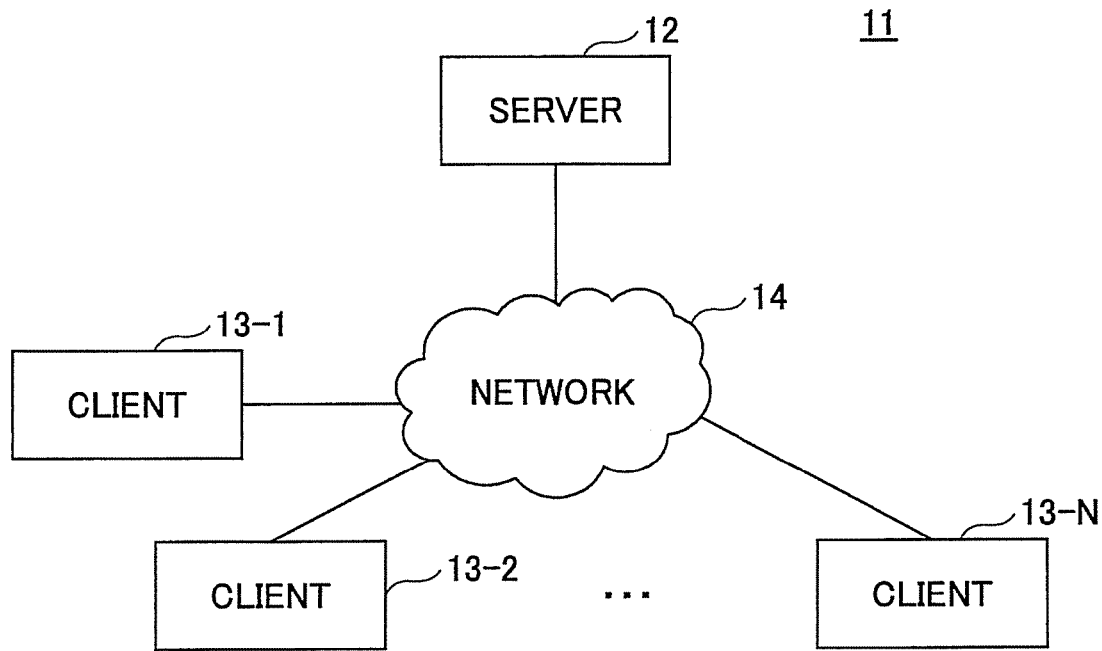
FIG. 1 is a block diagram illustrating an example of a server-client system in an embodiment.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It may be readily understood that aspects of this disclosure, as generally described herein, and illustrated in the Figures, may be arranged, substituted, combined, and designed in a wide variety of different configurations, all of which are explicitly contemplated and make part of this disclosure.

FIG. 1 is a block diagram illustrating an example of a server-client system in an embodiment. A server-client system 11 illustrated in FIG. 1 includes a Web server 12, and client terminals 13-1 through 13-N connectable to the Web server 12 via a network 14, such as the Internet, where N is an arbitrary natural number greater than zero (0). The Web server 12 may be formed by an information processing apparatus having a known structure that includes a processor, such as a CPU (Central Processing Unit), and a storage unit. Each of the client terminals 13-1 through 13-N may be formed by an information processing apparatus having a known structure that includes a processor, such as a CPU, and a storage unit.

Figure 2:
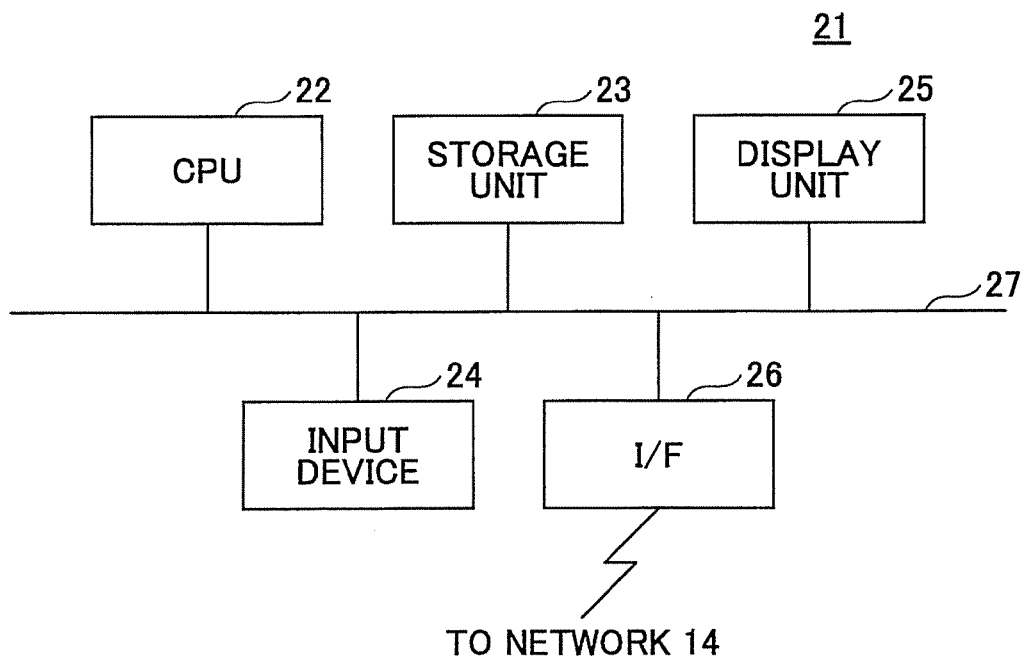
FIG. 2 is a block diagram illustrating an example of a general-purpose computer.

Hence, each of the Web server 12 and the client terminals 13-1 through 13-N may be formed by a general-purpose computer 21 illustrated in FIG. 2. The general-purpose computer 21 includes a CPU 22, a storage unit 23, an input device 24 such as a keyboard and a mouse, a display unit 25, and an interface (I/F) 26 that are connected via a bus 27. The CPU 22 may execute operations in response to inputs and/or instructions input from the input device 24. The storage unit 23 stores programs to be executed by the CPU 22, and various data including intermediate data of computations performed by the CPU 22. When the general-purpose computer 21 forms the Web server 12, the storage unit 23 may store Web pages of a Web site, and logs of accesses made from the client terminals 13-1 through 13-N.

The display unit 25 may display various information including inputs made from the input device 24, results of operations performed by the CPU 22, and messages. When the general-purpose computer 21 forms the client terminal 13-$i$, where i is an arbitrary value satisfying i=1 to N, the information displayed on the display unit 25 may include the Web site and the Web pages thereof provided by the Web server 12 and specified from the input device 24. The interface 26 connects to the network 14 illustrated in FIG. 1, for example.

Of course, the input device 24 and the display unit 25 may be formed by a single device such as a touchscreen panel.

The storage unit 23 may be formed by any suitable computer-readable storage medium that enables the programs and the data to be read by the CPU 22. For example, the computer-readable storage medium may be selected from, but is not limited to, semiconductor devices, magnetic recording mediums, optical recording mediums, or magneto-optical recording mediums.

The computer-readable storage medium may store a server program which, when executed by the CPU 22, causes the CPU 22 to perform a server process of the Web server 12, and may form a computer program product. On the other hand, the computer-readable storage medium may store a client program which, when executed by the CPU 22, causes the CPU 22 to perform a client process of the client terminal 13-$i$, and may form a computer program product. In the latter case, the client program may form a part of a browser program (or software) of the client terminal 13-$i$.

In some example embodiments, it is assumed for the sake of convenience that the Web server 12 is formed by an Apache HTTP server having a function of recording access logs using the known Web beacon technology. In addition, it is assumed for the sake of convenience that each of the client terminals 13-1 through 13-N is installed with the browser program (or software) and has a known browser function.

Figure 3:
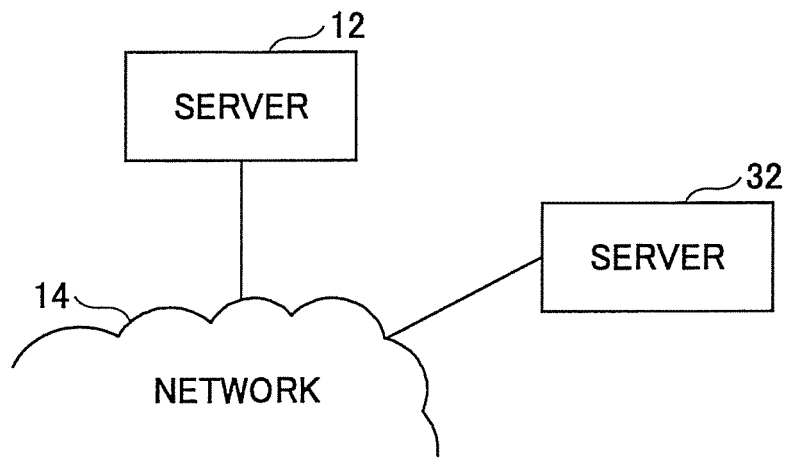
FIG. 3 is a block diagram illustrating an example of a server that records access logs taken by a Web server.
Figure 4:
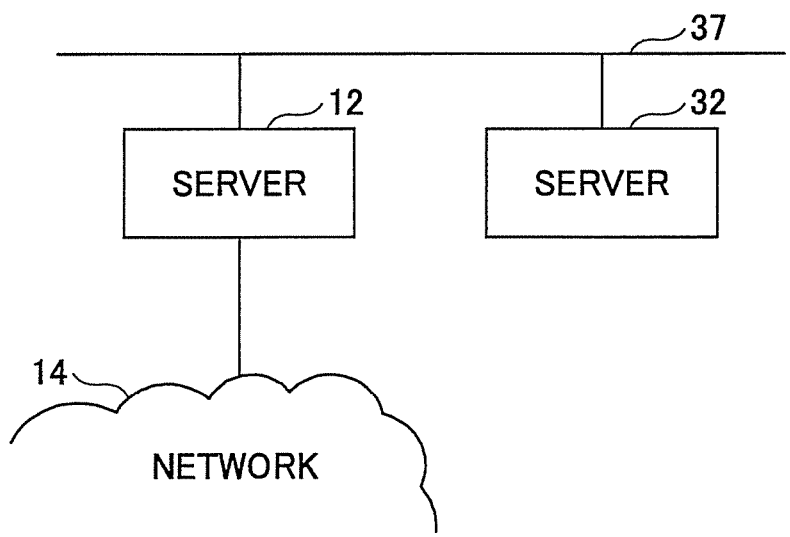
FIG. 4 is a block diagram illustrating another example of the server that records access logs taken by the Web server.

FIGS. 3 and 4 are block diagrams illustrating examples of a server that records access logs taken by the Web server 12.

It is not essential for the access logs to be recorded in the storage unit 23 of the Web server 12. For example, the access logs may be recorded in a storage unit 23 of a server 32, that may be formed by the general-purpose computer 21 illustrated in FIG. 2, and is connected to the network 14 as illustrated in FIG. 3. Alternatively, the access logs may be recorded in a storage unit 23 of a server 32, that may be formed by the general-purpose computer 21 illustrated in FIG. 2, and is connected to the Web server 12 via a network 37 different from the network 14. For example, the network 37 may be formed by a LAN (Local Area Network). The Web server 12 is communicable with the server 32 illustrated in FIG. 3 via the network 14, and the Web server 12 is communicable with the server 32 illustrated in FIG. 4 via the network 37. Furthermore, the server 32 illustrated in FIGS. 3 and 4 may be replaced by a storage system that has a known structure and is configured to store the access logs taken by the Web server 12.

Next, a description will be given of examples of an operation of this embodiment when the arbitrary client terminal 13-$i$ makes an access to a Web site provided by the Web server 12, by referring to FIG. 5.

Figure 5:
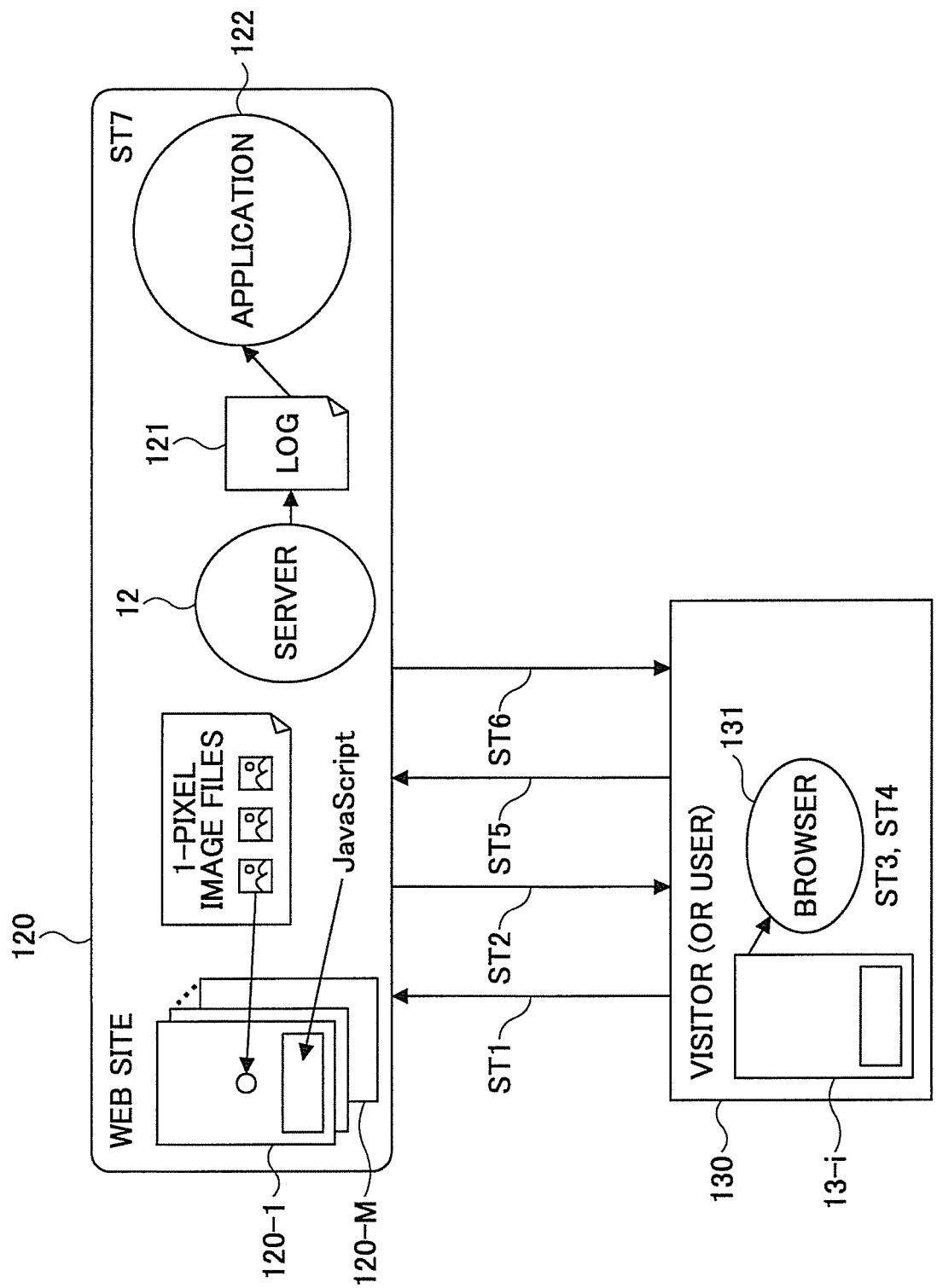
FIG. 5 is a diagram for explaining an access to a Web site.

FIG. 5 is a diagram for explaining an access from a visitor (or user) at the arbitrary client terminal 13-$i$ to a Web site 120 provided by the Web server 12, using a browser 131 of the client terminal 13-$i$. In FIG. 5, the Web server 12 provides the Web site 120 including Web pages 120-1 through 120-M, where M is a natural number greater than zero (0), and records a log 121. The Web server 12 further includes an application (or application program) 122 providing an analyzing function for analyzing the log 121, however, this application 122 may be provided in a server separate from but communicable with the Web server 12, such as the servers 32 illustrated in FIGS. 3 and 4, in order to remotely analyze the log 121. The Web pages 120-1 through 120-M, the log 121, and the application 122 may be stored or installed in the storage unit 23 of the Web server 12. The browser 131 may be installed in the storage unit 23 of the client terminal 13-$i$.

In a step ST1, the browser 131 requests the Web site 120 or the Web page 120-$j$ thereof in HTML (HyperText Markup Language) to the Web server 12, where j=0 to M. In a step ST2, the browser 131 acquires the requested Web page 120-$j$ of the Web site 120 in HTML from the Web server 12. In a step ST3, the browser 131 interprets the HTML of the acquired Web page 120$j$. In a step ST4, the browser 131 executes the JavaScript by dynamically embedding a single-pixel image file (1-pixel image file) that is dynamically added with a random parameter to a source of a <img> tag element, that is, to a file name of the single-pixel image file, in a <div> tag element. The random parameter includes at least current time data in units of milliseconds or less, for example, acquired in the client terminal 13-$i$. The <div> tag element originally indicates a block-level logical division, but is a generic element with no semantic meaning used to distinguish a document section.

In a step ST5, the browser 131 makes a request for the single-pixel image file to the Web server 12, by a GET command, for example, each time an input event is generated by the visitor at the client terminal 13-$i$. The input event is generated when the visitor operates the input device 24 of the client terminal 13-$i$, and includes a key-down in which a character string is input from the input device 24, a mouse-click in which any one of a coordinate, a line segment and the like is graphically input from the input device 24, a button-click in which a button displayed on the display unit 25 is clicked responsive to input to the input device 24 to execute a process, a check-box-click in which a check box displayed on the display unit 25 is clicked responsive to input to the input device to set a processing mode, and a radio-button-click in which a radio button displayed on the display unit 25 is clicked responsive to input to the input device to select a color, a mode and the like. Because the single-pixel image file is dynamically added with the random parameter in the request for the single-pixel image file, the single-pixel image file that is requested from the client terminal 13-$i$ may be read from the Web server 12, even if the single-pixel image file has been cached within the client terminal 13-$i$. For example, the single-pixel image file that is requested from the client terminal 13-$i$ may be read repeatedly from the Web server 12, even if the single-pixel image file has been cached within the client terminal 13-$i$.

In a step ST6, the Web server 12 reads the requested single-pixel image file from the Web site 120, and transfers the read single-pixel image file in HTML to the client terminal 13-$i$. At the same time, which may include "concurrently" and substantially simultaneous to", the Web server 12 records the log 121 of the access made from the client terminal 13-$i$, namely, the request for the single-pixel image file. The log 121 that is recorded at the Web server 12 may include the random parameter, that is, at least the current time data in units of milliseconds or less acquired from an internal timer or the like within the client terminal 13-$i$ and added to the single-pixel image file in the request for the single-pixel image file, in addition to an IP address, a domain name, an access date and time (only in units of seconds or greater) acquired from an internal timer or the like within the Web server 12, an access page name, a referrer (that is, a page referred immediately prior to the access) and the like of the visitor that are recorded by the function of recording access logs using the known Web beacon technology.

In a step ST7, the application 122 analyzes the log 121 when necessary, in response to a request (or command) input from the input device 24 of the Web server 12 by an operator or manager of the Web server 12, for example. Because the log 121 that is recorded at the Web server 12 may include the random parameter, that is, at least the current time data, added to the single-pixel image file in the request for the single-pixel image file, the log 121 may store causality of operations associated with the access and made by the visitor and accurately reflects such operations. Accordingly, the application 122 may restore the causality of the operations associated with the access made by the visitor at the Web site 120, from the log 121, even if the recording order in the log 121 does not guarantee the causality. The application 122 may reconstruct the operations associated with the access made by the visitor at the Web site 120 if the random parameter added to the single-pixel image file in the request for the single-pixel image file further includes information necessary to reconstruct the operations (or input events) associated with the access made by the visitor.

Accordingly, each time an input event is generated at the client terminal 13-$i$, the browser 131 may newly read the requested single-pixel image file from the Web server 12, even if the requested single-pixel image file has already been cached within the client terminal 13-$i$. The browser 131 may acquire the current time data, to be added to the single-pixel image file in the request for the single-pixel image file, by executing Date( ).getTime( ) immediately prior to making the request for the single-pixel image file. The current time data may be added after the image file name or the image URL, as the random parameter.

The order in which the log 121 is recorded at the Web server 12 is not in the order of the requests (or commands), but is in the order of execution of the requests. However, since the current time data Date( ).getTime( ) acquired in the client terminal 13-*i* and added to the single-pixel image file in the request for the single-pixel image file has a time resolution on the order of milliseconds or less, the causality of the operations associated with the access may be restored using the current time data by reordering the requests in the order of execution into the order of the requests. This is because the time resolution of the current time data in units of milliseconds or less is relatively high compared to a maximum human response speed on the order of 0.01 second, that is, the time required for the manual operation such as the mouse click to be made by the visitor at the client terminal 13-*i*.

On the other hand, the random parameter added to the single-pixel image file in the request for the single-pixel image file may further include information necessary to reconstruct the operations associated with the access made by the visitor. In other words, parameters segmented by a segmenting code (or symbol) "&" may be added to the single-pixel image file in the request for the single-pixel image file, in addition to the current time data. The parameters added to the current time data may include the character string input by the key-down, the pixel or line segment coordinates specified by the mouse-click, identification information identifying the button clicked by the button-click, identification information identifying a check box clicked by the check-box-click, identification information identifying a radio button clicked by the radio-button-click, and any other information that needs to be recorded in the log 121 and is necessary to reconstruct the operations associated with the access made by the visitor. For example, if the random parameter is to include the current time data and the character string input by the key-down, the random parameter added to the single-pixel image file becomes as follows.

?(Current Time Data)&(Character String Input By Key-Down)

Therefore, the application 122 may restore the causality of the operations associated with the access made by the visitor at the Web site 120, from the log 121, even if the recording order in the log 121 does not guarantee the causality, and may also reconstruct the operations associated with the access made by the visitor at the Web site 120 if the random parameter added to the single-pixel image file in the request for the single-pixel image file further includes the above information necessary to reconstruct the operations associated with the access made by the visitor, including information related to input events generated at the client terminal 13-*i*. This is because the time resolution of the current time data in units of milliseconds or less is relatively high compared to the maximum human response speed on the order of 0.01 second, that is, the time required for the manual operation such as the mouse click to be made by the visitor at the client terminal 13-*i*.

In this embodiment, the log 121 recorded in the Web server 12 may conform to the log recorded by the Apache HTTP server. Because the log recorded by the Apache HTTP server may be read and processed by a Windows (Registered Trademark) application (for example, c++, VB, VBA, etc.), a person developing the software for the Web server 12 may require general knowledge of the Windows application and may not require special knowledge or experience associated with the communication technology. In addition, a person developing the software for the client terminal 13-*i* may require general knowledge of the HTML and JavaScript. Furthermore, the information to be included in the log 121 is concealed in the request for the single-pixel image file sent from the client terminal 13-*i* to the Web server 12, without requiring the visitor at the client terminal 13-*i* nor the operator or manager at the Web server 12 to be aware of the mechanisms for achieving the necessary information transfer to the Web server 12.

For at least these reasons, the visitor at the client terminal 13-*i* and the operator or manager at the Web server 12 do not require special knowledge or skills in order to transfer the information to be included in the log 121 from the client terminal 13-*i* to the Web server 12. For example, the client terminal 13-*i* may receive the single-pixel image file from the Web server 12 in JSONP (JavaScript Object Notation with Padding), and a dynamic bi-directional communication may be achieved by concealing the information to be included in the log 121 within the request for the single-pixel image file. The development of the program of the client terminal 13-*i* may require knowledge of the JavaScript and may not rely on an external AJAX (Asynchronous JavaScript+XML (eXtensible Markup Language)) library, external ASP (Active Server Pages, Registered Trademark) or the like. Moreover, the Web server 12 may be formed by the Apache HTTP server installed with the Windows application, for example. Furthermore, the browser 131 may make the request for the single-pixel image file to the Web server 12 by the GET command in order to send the random parameter to be recorded in the log 121, without having to use a POST command.

On the other hand, because the log 121 is recorded each time an input event is generated at the client terminal 13-*i*, it may be unnecessary to perform a process exclusively for updating the log 121. The recording of the log 121 may not be affected by the browser environment at the client terminal 13-*i*, as long as the browser 131 supports the JavaScript. In addition, provided that the Web site 120 supports the JavaScript, the transfer of the random parameter using the <img> tag element, added to the single-pixel image file and concealed in the request for the single-pixel image file, may not be blocked by security protocols provided in or security software installed in the Web server 12.

According to some examples, it may be confirmed that, when an access is made to from the client terminal to the Web site of the Web server in accordance with this embodiment using various existing browsers supporting the JavaScript, the access log including the random parameter that includes the current time data and the information necessary to reconstruct the operations associated with the access made may be automatically recorded by the Web server. Example browsers may include, but are not limited to, Internet Explorer, Firefox, Google, Chrome, Opera, or Safari (Registered Trademarks). It may also be confirmed that no access blocking may occur and no alarms may be generated with respect to the access from the browser, by existing security protocols provided in or existing security software installed in the Web server. Example security software may include, but is not limited to, Norton, Kaspersky, or McAfee (Registered Trademarks).

If the client terminal does not support the JavaScript, measures may be taken so that the visitor may only access the Web site of the Web server after the JavaScript is enabled in the browser. For example, the JavaScript may be enabled in the browser immediately after starting the HTML, by use of a z-index of the <div> tag element. More particularly, a blocking wall may be displayed within the <div> tag element set with the z-index using the <img> tag element, for example, so that the blocking wall may be displayed in the foreground of the contents within the body of the HTML. In this case, the Web page may be blocked by the blocking wall if the JavaScript is disabled. The blocking wall may be removed when the JavaScript is enabled, by writing " " (null) with respect to the <div> tag element within the function that is called immediately after starting, as <body onload="init( )">, for example. As a result, the visitor from the browser not supporting the JavaScript may only view the Web site after enabling the JavaScript, and the viewing of the Web site may otherwise be blocked by the blocking wall.

Figure 6:
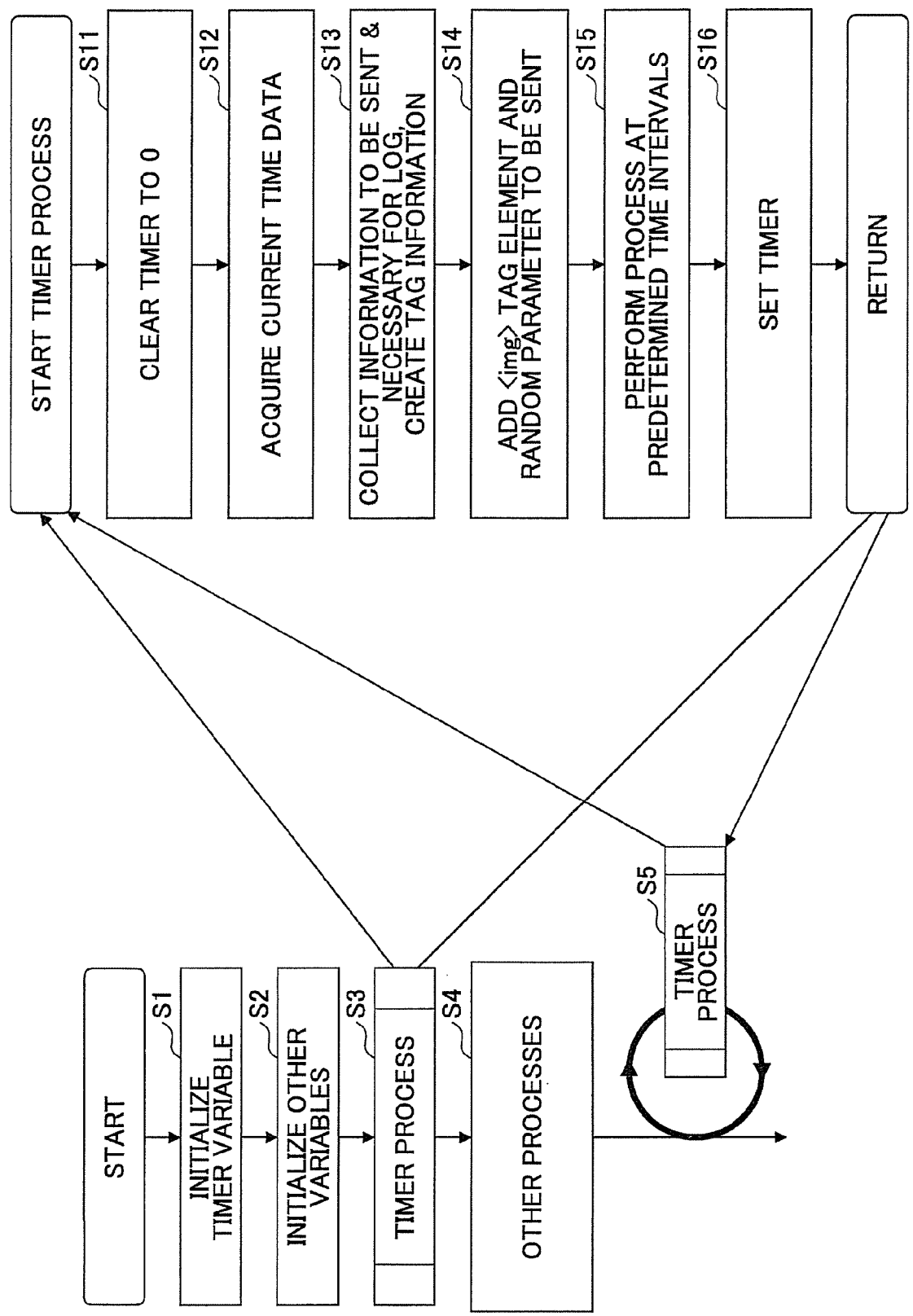
FIG. 6 is a flow chart for explaining a browser process responsive to a timer event.

FIG. 6 is a flow chart for explaining a browser process responsive to a timer event. The browser process illustrated in FIG. 6 starts after the browser 131 read the requested Web page 120-*j* from the Web server 12.

A step S1 illustrated in FIG. 6 initializes a timer variable by var visit_Tim=0; and a step S2 initializes other variables by var nTrans=0. A step S3 performs a timer process for every 1 minute, for example, and starts a timer process of steps S11 through S16 by Visiting( ). A step S4 performs other processes of the browser 131. A step S5 performs a timer process to start the timer process of steps S11 through 16 for every predetermined time.

When the timer process starts, a step S11 clears the timer to 0 if necessary by clearTimeout(visit_Tim); for example. A step S12 acquires the current time data in units of milliseconds from the internal timer of the client terminal 13-*i* by var bgm_ntim=new Date( ).getTime( ); for example. A step S13 collects information to be sent and necessary for the log 121, and creates tag information to be sent as follows, for example.

```
var send_msg="<img src=¥"b/p.gif?content=Mukade
&dummy="+bgm_ntim+"&MovieID="+Music_ID+"&TimeCount=
"+nTrans+"¥">";
```

A step S14 adds (or writes) the <img> tag element and the random parameter to be sent to the Web server 12 in a concealed manner within the <div> tag element as follows, for example.
    document.getElementById("Sensor")
        .innerHTML=send_msg;

A step S15 performs a process at predetermined time intervals by incrementing the number of interrupts by 1 by nTrans++; for example. Thereafter, a step S16 sets the timer by visit_Tim=setTimeout('Visiting( )', 60000); for example, and the process returns to the timer processes of the steps S3 and S5. Accordingly, the necessary information may be sent to the Web server 12 in order to record the log 121 of the access made from the browser 131 and the timer events including the operations associated with the access made by the visitor.

FIG. 7 is a diagram illustrating an example of the access log that is recorded responsive to the timer event. In FIG. 7, the log 121 includes an IP address of the visitor, a domain name or a sub-domain name of the visitor, a current time in units of seconds acquired at the Web server 12, and tag information dynamically embedded and sent from the client terminal 13-*i* in a concealed manner when sending the request for the Web page 120-*j*. In this example, the tag information includes a name of the single-pixel image file, a name of the contents, the current time data in units of milliseconds acquired at the client terminal 13-*i*, information on a movie (or dynamic image) visited by the visitor, and time in units of minutes for which the visitor continued the visit. For example, in the first (or uppermost) line of the log 121, the name of the single-pixel image file is "content=Mukade", the name of the contents is "dummy", the current time data in units of milliseconds acquired at the client terminal 13-*i* is "1275231663144", the information on the movie visited by the visitor is "MovieID=PrMDZiHnaLs", and the time in units of minutes for which the visitor continued the visit is "TimeCout=186".

Figure 8:
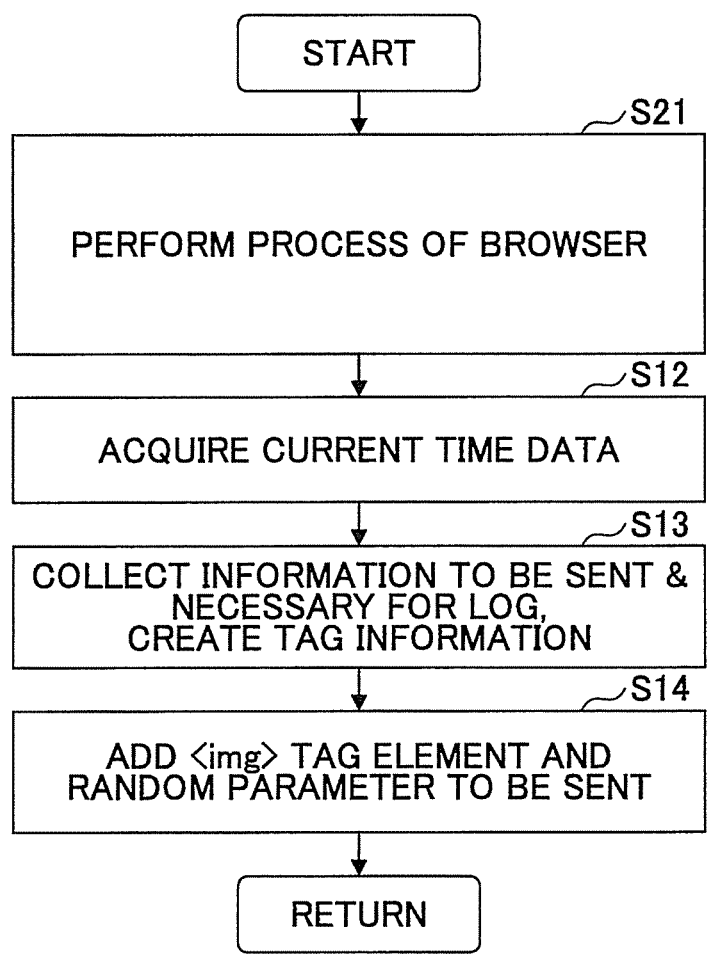
FIG. 8 is a flow chart for explaining a browser process responsive to an input event.

FIG. 8 is a flow chart for explaining a browser process responsive to an input event. In FIG. 8, those example steps that are the same as those corresponding example steps in FIG. 6 are designated by the same reference numerals, and a detailed description thereof will be omitted. The browser process illustrated in FIG. 8 starts when an input event is generated at the client terminal 13-*i* to which the browser 131 belongs.

A step S21 illustrated in FIG. 8 performs a process of the browser 131, that may include the key-down, the mouse-click, the button-click, the check-box-click, the radio-button-click and the like. The step S12 acquires the current time data in units of milliseconds, and the step S13 collects information to be sent and necessary for the log 121, and creates tag information to be sent. The information collected in the step S13 may include the character string input by the key-down, any one of the coordinate, the line segment and the like graphically input by the mouse-click, the button clicked to execute the process by the button-click, the check box clicked to set the processing mode by the check-box-click, and the radio button clicked to select the color, the mode and the like by the radio-button-click. The step S14 adds (or writes) the <img> tag element and the random parameter to be sent to the Web server 12 in a concealed manner within the <div> tag element.

The coordinate graphically input by the mouse-click and collected in the step S13 may be a coordinate on a screen of the web page 120-*j* acquired from the coordinate of the mouse cursor on the display unit 25 of the client terminal 13-*i*. According to JavaScript, when the image file is clicked on the screen, the xy coordinates of the clicked position of the image file may be obtained as the argument. A small and transparent image file may be embedded in a checker-board pattern on the Web page 120-*j* using the <div> tag element. Hence, it is possible to easily recognize the xy coordinates of the clicked image file and the <div> tag element in which the image file is embedded or, the image file on which the mouse cursor is positioned, by an input event such as onclick and onmouseover. For example, the following <img> tag element may be dynamically embedded in the onclick event.
    <img src="p.gif?dummy=[Current Time Data in Milliseconds]&mouseClick& pic_num=[Number Assigned to Small Image Region]&x=[x Coordinate]& [y Coordinate]">

The input event is recorded in the log 121 in the following manner, for example, thereby making it possible for the application 122 to determine the region on the screen that was clicked by the visitor viewing the Web page 120-*j*.
    p.gif?dummy=1255979515213&mouseClick&pic_num=121&x=56&y=57

Accordingly, the input events, such as the mouse operations (specifying coordinates, clicking buttons, etc.) and the inputting of character strings, performed by the visitor on the Web page 120-*j* may be recorded in the log 121, and the application 122 may analyze the input events and determine portions of the Web page 120-*j* that were of interest to the visitor.

Because the Apache HTTP server forming the Web server 12 in this embodiment is also operable in a Linux (Registered Trademark) environment, the input event generated at the client terminal 12-*i* may be recorded in the log 121 of the Web server 12 with respect to virtually any kind of personal computer forming the client terminal 12-*i*. In addition, it is unnecessary to rely on a JavaScript external file for the AJAX communication since the JavaScript is enabled when the client terminal 12-*i* makes access to the Web page 120-*j* of the Web server 12.

Figure 9:
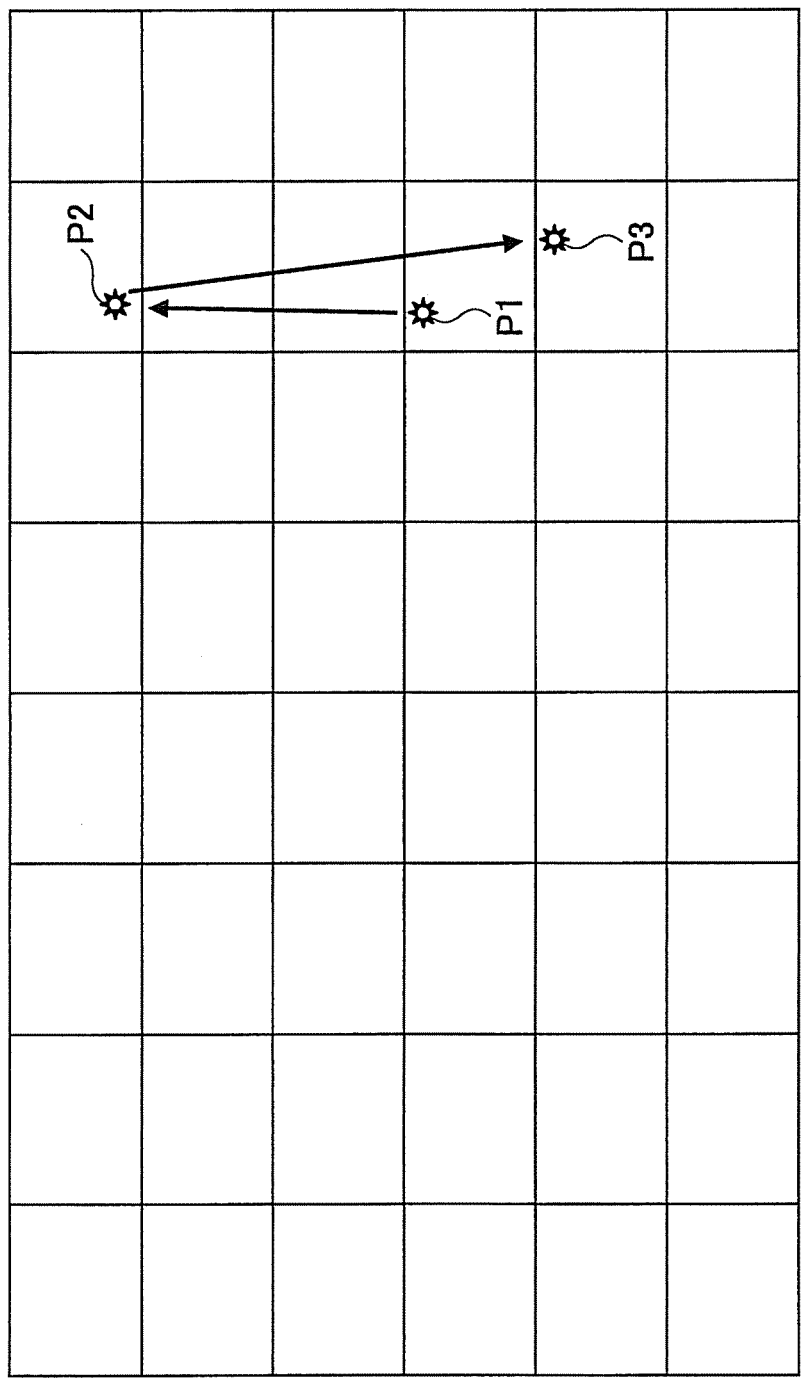
FIG. 9 is a diagram for explaining an example of an input event.

FIG. 9 is a diagram for explaining an example of the input event. FIG. 9 illustrates an example in which the mouse is clicked at three (3) positions P1, P2 and P3 on the screen of the Web page 120-*j*. For the sake of convenience, an illustration of characters, images and the like that are actually displayed on the screen is omitted in FIG. 9, and only the small and transparent image files embedded in the checker-board pattern are illustrated. In this case, the browser 131 adds (or writes) the <img> tag element and the random parameter to be sent to the Web server 12 in a concealed manner within the <div> tag element, where the random parameter includes at least the current time data and the coordinates of the mouse cursor at the three positions P1, P2 and P3. Accordingly, the mouse operations performed by the visitor on the Web page 120-*j* may be recorded in the log 121, and the application 122 may analyze the input events and determine portions of the Web page 120-*j* that were of interest to the visitor from the coordinates of the three positions P1, P2 and P3 in relation to the Web page 120-*j* that was being visited by the visitor when the input event was recorded in the log 121.

Figure 10:
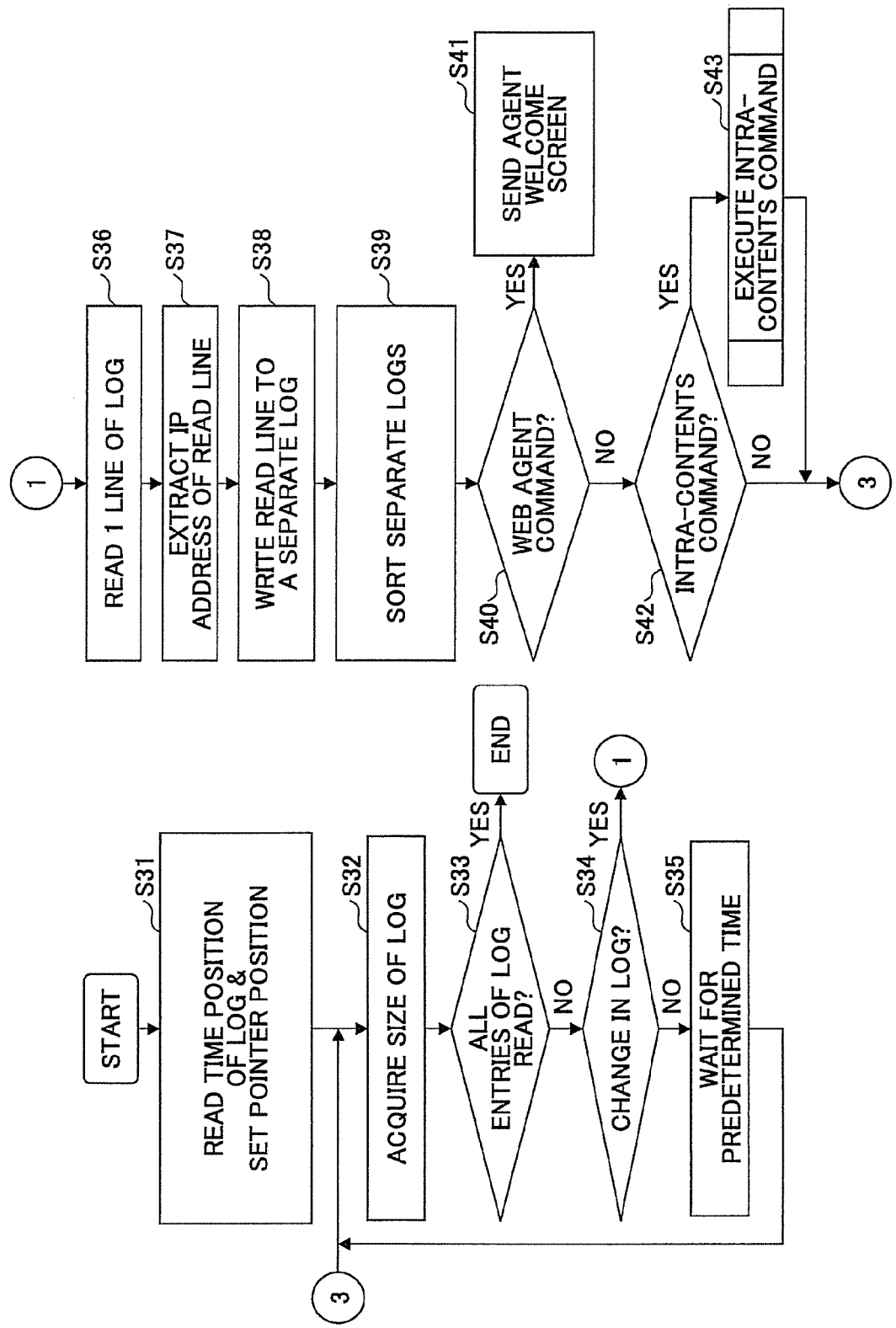
FIG. 10 is a flow chart for explaining a Web server process when collecting information from the access log.

FIG. 10 is a flow chart for explaining a Web server process of the Web server 12 when collecting information from the log 121. The Web server process illustrated in FIG. 10 is performed by the application 122 illustrated in FIG. 5, for example.

A step S31 illustrated in FIG. 10 reads a time position of the log 121 for which the analysis has been completed by the previous process, and sets a pointer position indicating the start of the analysis by the current process that is to be performed in relation to the read time position. A step S32 acquires the size of the log 121, and a step S33 judges whether all entries of the log 121 have been read. If the judgment result in the step S33 is NO, a step S34 judges whether a change is detected in the log 121. If the judgment result in the step S34 is NO, a step S35 waits for a predetermined time before returning the process to the step S32.

On the other hand, if the judgment result in the step S34 is YES, a step S36 reads one (1) line of the log 121 and a step S37 extracts the IP address of the read line. A step S38 writes the read line to a separate log (not illustrated) that is created for each IP address. A step S39 sorts the separate logs that have been created for each of the IP addresses, based on the current time data in units of milliseconds embedded in the tag information of the log 121.

A step S40 judges whether a Web agent command issued from the operator or manager of the Web server 12 is received. If the judgment result in the step S40 is YES, a step S41 sends an agent welcome screen to be displayed on the display unit 25 of the Web server 12, in order to receive other commands issued from the operator or manager. On the other hand, if the judgment result in the step S40 is NO, a step S42 judges whether an intra-contents command issued from the application 122 is received. If the judgment result in the step S42 is YES, a step S43 executes the intra-contents command, such as plotting, searching, storing, copying and deleting specified contents. If the judgment result in the step S42 is NO or, after the step S43, the process returns to the step S32. Accordingly, the application 122 may extract information of interest to the operator or manager from the log 121, and analyze the extracted information automatically or semi-automatically in response to the commands issued from the operator or manager of the Web server 12.

In order to encourage visitors to frequently visit the Web site 120 and continue each visit for a relatively long time, it may not only be important to make the contents of the Web site 120 interesting but also important to provide appropriate or interesting music at the Web site 120. The information to be embedded in the tag information of the log 121 may be appropriately selected in this embodiment to suit the purposes of the analysis performed by the application 122 or the like of the Web server 12. Hence, an example of BGM (BackGround Music) player that is suited for use in analyzing information related to the visitor who visited the Web site 120, such as the length of time the visitor continued the visit, the kind of music preferred by the visitor, and the music selected by the visitor, is described in the following.

Movie data, including animation data, to be used by the BGM player may be provided at any location within the server-client system 11 or, at any location accessible from the server-client system 11. However, when restrictions on the communication traffic that is determined by the communication capacity and the processing speeds of the Web server 12 and the client terminals 13-1 through 13-N are taken into consideration, it may be useful to utilize cross-domains that are rich in contents and have less restrictions on the communication traffic. A typical example of such a cross-domain is the video hosting service such as the YouTube (Registered Trademark). Even if the communication speed is 100 Mbps or less, once the HTML is read from the Web site, this Web site will only be accessed again when the music is changed or comments have been uploaded to this Web site. As a result, a video hosting service may be provided with respect to a relatively large number of users even in a relatively primitive communications environment.

The conventional method of utilizing an embedded object may only play one particular music. In addition, the conventional method of utilizing the playlist may not switch to another playlist during play, change the playing order of the music, or skip the music at will.

Accordingly, the information to be embedded in the tag information of the log 121 may be appropriately selected in this embodiment in order to minimize such inconveniences of the conventional methods. More particularly, a record of a movie ID recorded at the video hosting service site, a title of the music of the movie, a playing time, comments, updated year, month and day, and the like may be registered in a JavaScript file having a js format that may be used in HTML. In addition, a plurality of such records are grouped as a playlist, and data having the JSON format are recorded so that a plurality of playlists may be managed as a movie tour. In this embodiment, the BGM player is called by a plurality of HTMLs and a plurality of music is centrally managed by a single JavaScript file. However, it is of course possible to include the JavaScript within the HTML.

Figure 11:
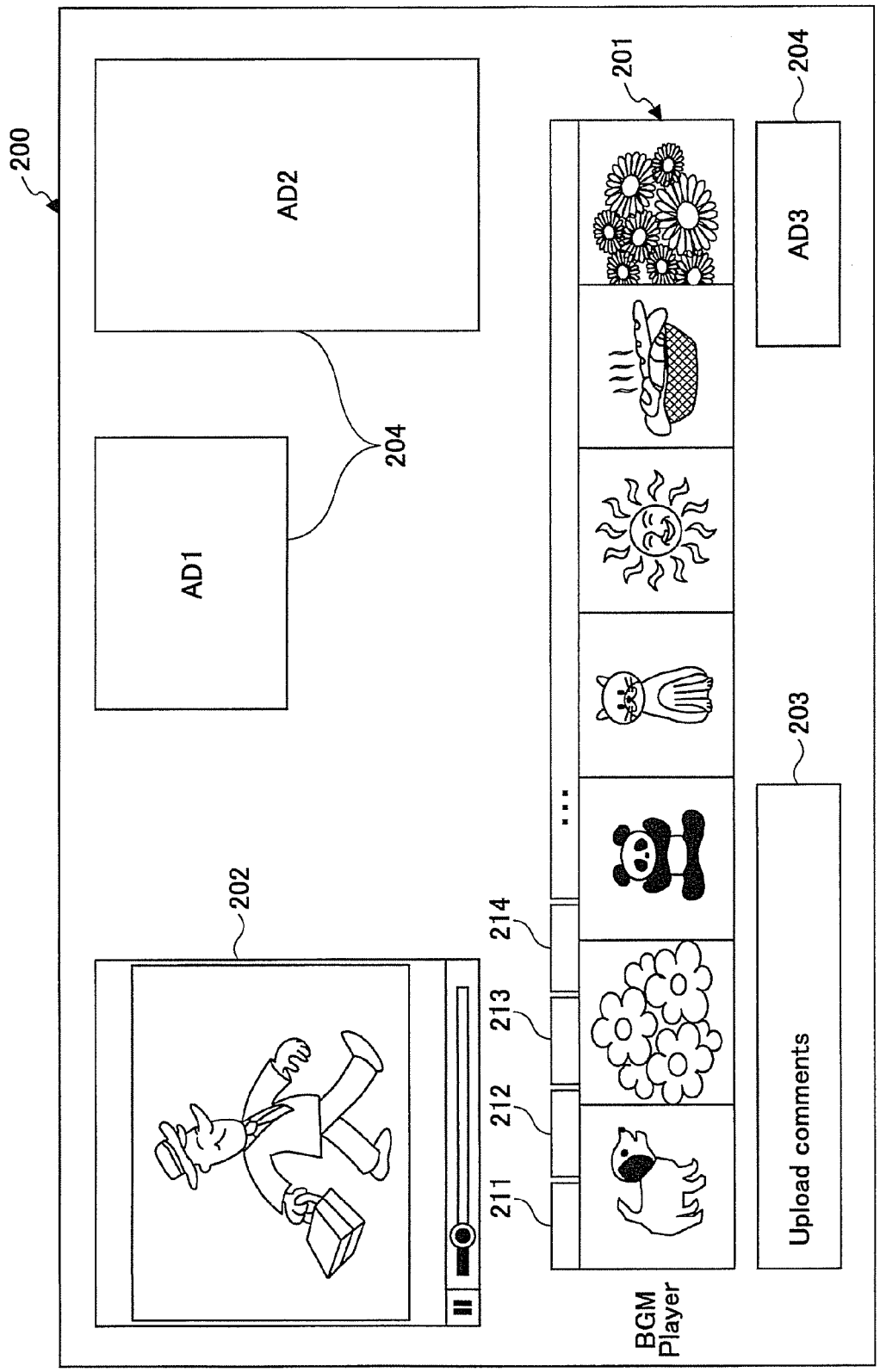
FIG. 11 is a diagram illustrating an example of a screen displayed on at the client terminal for explaining the movie tour.

FIG. 11 is a diagram illustrating an example of a screen displayed on the display device 25 of the client terminal 13-*i* for explaining the movie tour. In FIG. 11, a screen 200 includes an area 201 for displaying movies included in the movie tour, an area 202 for playing the movie automatically or manually selected from the movie tour, an area 203 for uploading comments, and an area 204 for displaying advertisements AD1, AD2 and AD3. The screen 200 may further include various buttons and/or thumbnails for making various instructions and/or calling various functions, including music selection buttons, image thumbnails. For the sake of convenience, FIG. 11 illustrates a button 211 for instructing automatic music selection, a button 212 for stopping music selection, a button 213 for selecting next music, and a button 214 for changing the movie tour.

Figure 12:
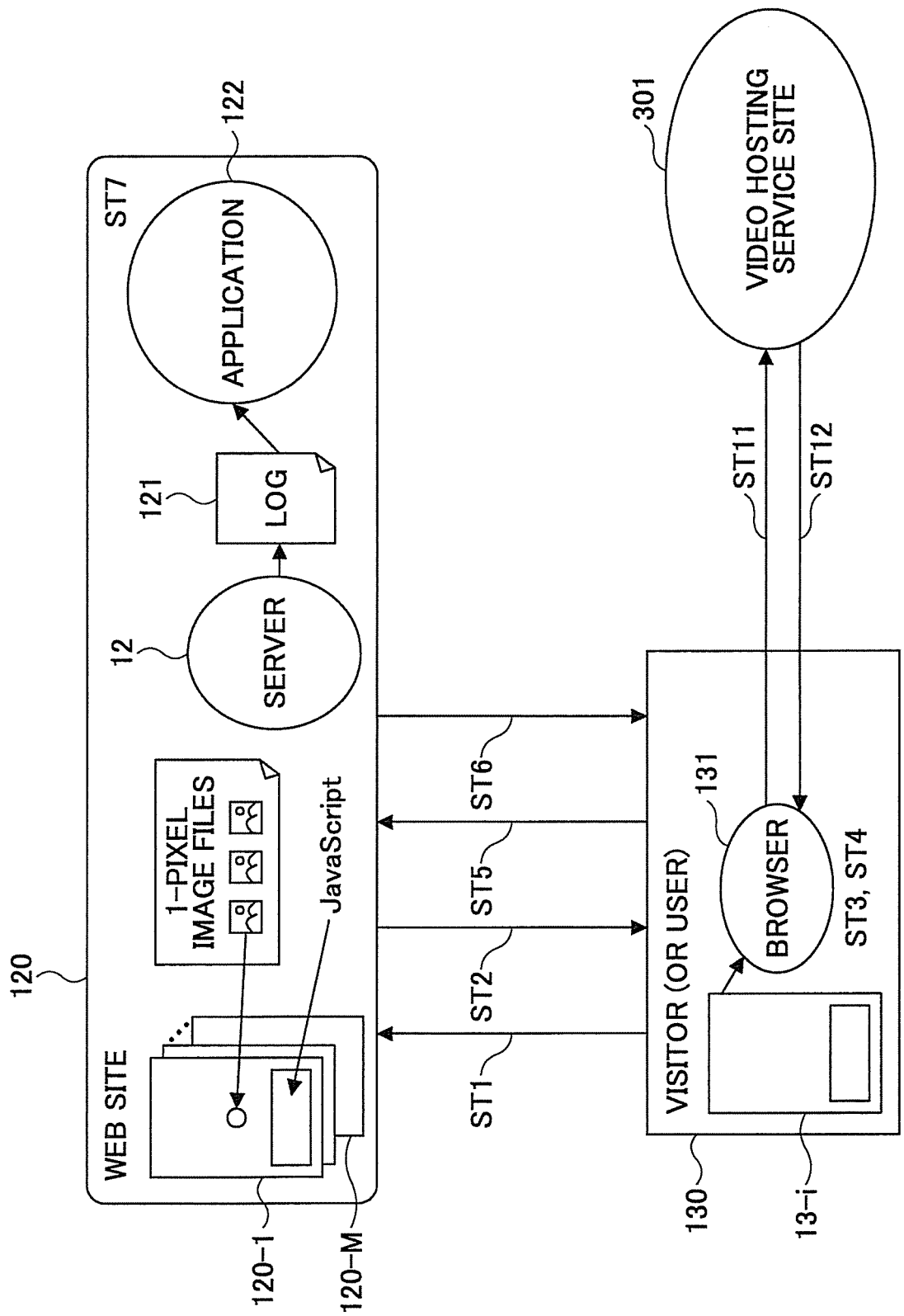
FIG. 12 is a diagram for explaining an access to a Web site associated with a playlist.

FIG. 12 is a diagram for explaining an access to a Web site associated with the playlist. In FIG. 12, those example parts that are the same as those corresponding example parts in FIG. 5 are designated by the same reference numerals, and a description thereof will be omitted.

In FIG. 12, steps ST11 and ST12 are performed by the browser 131 of the client terminal 13-*i* prior to the step ST5. In the step ST11, the browser 131 requests distribution of movies in units of movie IDs with respect to a video hosting service site 301. In a step ST12, the browser 131 receives the requested movies in units of movie IDs from the video hosting service site 301. The steps ST11 and ST12 may be performed by known functions of the browser 131.

After the step ST12, the browser 131, in the step ST5, makes a request for the single-pixel image file to the Web server 12, by a GET command, for example, each time an input event is generated by the visitor at the client terminal 13-*i*. In this case, however, the random parameter added to the single-pixel image file in the request for the single-pixel image file may further include the information necessary to reconstruct the operations associated with the access made by the visitor, including information related to input events generated at the client terminal 13-*i*. The information related to the input events may include input events associated with the inputs made by the visitor with respect to the video hosting service site 301.

Hence, the random parameter added to the single-pixel image file in the request for the single-pixel image file sent to the Web server 12 in the step ST5 may include the information related to the input events, such as the record of the movie ID recorded at the video hosting service site 301, the title of the music of the movie, the playing time, comments, updated year, month and day, the buttons selected on the screen 200, and the comments uploaded from the screen 200. A plurality of such records may be grouped as a playlist and included in the information related to the input events. As a result, the log 121 recorded in the Web server 12 also includes such information related to the input events associated with the inputs made by the visitor with respect to the video hosting service site 301. Furthermore, the application 122 may acquire information related to the visitor who visited the Web site 120, such as the time for which the visitor continued the visit, the kind of music preferred by the visitor, and the music selected by the visitor, by analyzing the log 121.

FIG. 13 is a diagram illustrating an example of the playlist of the JavaScript file. In this example, some fields following the data elements of the playlist are written in Japanese, because it is assumed for the sake of convenience that the Web site 120 visited by the visitor is in Japanese. In other words, the field following the data elements of the playlist may be written in an arbitrary language, including Japanese.

For example, an English translation of the fields written in Japanese for the first five (5) lines (1st to 5th lines) in FIG. 13 may read as follows as indicated in Italics.

1st line:
var playlist = { "num": 3, "width": "280", "height": "230", "tour": [
2nd line:
{"name": "tour1", "tour_name": "Chibi Miku", "width": "60px", "count": 6, "movie_data": [
3rd to 5th lines:
{"movie_id": "ve2cmAwh3b4", "time_length": 277000, "upload_date": "2009/04/03", "title":
" [MikuMikuDance] LOVE & JOY 4 (Chibi Miku & Hatsune Miku)", "comment": "Oh? Is the movie created using a physical engine? The simulation of tension and gravity is perfect. Probably used an automatic correction tool ... superhuman feat if done manually.

-continued

The expressions are also good. The "child" is well represented by the line of vision and behavior."}, An English translation of the fields written in Japanese for the sixth and subsequent lines in FIG. 13 will be omitted in this specification, because among other things, at least one purpose of FIG. 13 is to illustrate an example of the playlist of the JavaScript file and to illustrate that some fields following the data elements of the playlist may be written in an arbitrary language, including Japanese.

The playlist illustrated in FIG. 13 includes data elements "num", "width", "height", and "tour". The data element "num" indicates the number of movies tours recorded in the playlist. The data elements "width" and "height" respectively indicate the width and height, that is, the size of the screen that displays the movie in units of pixels. The data element "tour" indicates the arrangement order of the movie tours.

Each example movie tour element includes data elements "name", "tour_name", "width", "count", or "movie_data". The data element "name" indicates a name for calling a movie tour function. In FIG. 13, PL1, PL2 and PL3 respectively denote data elements associated with the movie tour functions tour1, tour2 and tour3. The data element "tour_name" indicates a tour name for each movie tour, which may have a corresponding selection button displayed on the screen 200 illustrated in FIG. 11. The corresponding selection button is not displayed on the screen 200 if the data element "tour_name" is "-". The data element "width" indicates a width of the corresponding selection button to be displayed on the screen 200 in units of pixels. The data element "count" indicates a number of movie forming the movie tour. The data element "movie_data" indicates the arrangement order of the movies forming the movie tour, that is, the movie data arrangement.

Each example movie data arrangement "movie_data" includes data elements "movie_id", "time_length", "upload_date", "title", or "comment". The data element "movie_id" indicates a movie ID provided by the video hosting service site 301, which may be the YouTube, for example. The data element "time_length" indicates the play time of the movie in units of milliseconds. The data element "upload_date" indicates the year, month and day when the movie was updated to the video hosting service site 301. The data element "title" indicates the title of the movie, and the data element "comment" indicates comments written in an arbitrary language (Japanese for this example) uploaded by an editor (or owner of the video hosting service site 301) with respect to the movie. If the value of the data element "time_length" is set shorter than the actual recording time of the movie, it is possible to play only the introductory portion of the movie.

In the JavaScript, if a music selection button or an image thumbnail is selected by a mouse click, for example, the information on variables such as BGM_tour and BGM_movie is sent to the Web server 12 by a SendInfo function in response to the input event (that is, mouse click). The image thumbnail may be formed by an image type input element, more particularly, by dynamically generating the following tag. If the video hosting service site 301 is the YouTube, for example, the thumbnail data may be acquired by accessing "http://i1.ytimg.com/vi/[Movie ID]/default.jpg". By using such a tag, the title is displayed when the mouse cursor is placed on the image thumbnail. An onclick event is generated when the mouse cursor placed on the image thumbnail is clicked, to thereby call a changeMovie function and acquire, as the argument, the variable i which indicates the kth position of the music to be played amongst the plurality of music arranged in order, where k is a natural number greater than one (1). Of course, an input element (<input> tag) may be scrolled on the screen 200 using a <marquee> tag in the browser 131, such as the Internet Explorer, Google, Chrome, Safari and Opera.

FIG. 14 is a diagram illustrating an example of a dynamically generated tag "v img.tag".

FIG. 15 is a diagram illustrating an example of a SendInfo function that is called. When the SendInfo function illustrated in FIG. 15 is called by an input event such as a mouse click of a button or thumbnail specifying the SendInfo function, the <img> tag element is dynamically inserted into the <div> tag element that is added with an ID called SendMsg. The current time data "dummy=*******" added after "?" is used in place of the random number. Accordingly, even if the browser 131 of the client terminal 13-i has the caching function, the browser 13 may send or forward the HTTP GET to the Web server 12 in order to read the p.gif file from the Web server 12. This means that the random parameter may be sent or forwarded to the Web server 12 and recorded in the log 121. For example, the browser 13 may repeatedly send or forward the HTTP GET to the Web server 12 in order to read the p.gif file from the Web server 12, and the random parameter may be repeatedly sent or forwarded to the Web server 12 and recorded in the log 121.

FIG. 16 is a diagram illustrating an example of the access log including information related to input events generated at the client terminal illustrated in FIG. 12.

The log 121 illustrated in FIG. 16 that is recorded at the Web server 12 includes an IP address 501, a domain name 502, an access date and time (only in units of seconds or greater) 503 acquired from the internal timer or the like within the Web server 12, and a referrer 504 indicating a URL of a Web page accessed by the visitor, that are recorded by the function of recording access logs using the known Web beacon technology. The log 121 additionally includes the random parameter that is added to the single-pixel image file in the request for the single-pixel image file sent from the client terminal 13-i to the Web server 12. The random parameter in this example includes the current time data 505 in units of milliseconds or less acquired from the internal timer or the like within the client terminal 13-i, and selected music information indicating the music selected by the visitor while visiting the Web page 130-j. FIG. 16 illustrates a case where the selected music information includes a movie tour ID (or movie tour number) 506 indicating the movie tour, and a movie ID (or movie number) 507 indicating the movie in the movie tour. Of course, the input event recorded in addition to the current time data 505 is not limited to the selected music information.

By extracting the log information having of a certain IP address from the log 121 illustrated in FIG. 16, the application 122 may determine the length of time a visitor having the certain IP address continued the visit, the kind of music preferred by the visitor, or the music selected by the visitor. The application 122 may also analyze the log 121 and determine frequent visitors to a certain Web page, or determine the Web pages frequently visited by a relatively large number of visitors. In addition, the order of the movies in the move tour may be changed based on the preferences of the visitors analyzed from the log 121.

Of course, the length of time the visitors visit the Web page 120-j may be determined with a high precision by recording the input events in units of 1000 milliseconds to 10000 milliseconds using a SetTimeout function. In this case, a routine called by the SetTimeout function may specify a time until this routine is called next.

In the example illustrated in FIG. 16, the visitor having the IP address "218.226.144.236" only listened to the eighth music (No. 7) for less than 1 minute and a half, even though the eighth music (No. 7) is 3 minutes and 47 seconds long. This visitor returned the selection of the music to that of the original movie tour, namely, the first music (No. 0), as indicated within dotted lines in FIG. 16. Hence, it may be regarded that this visitor prefers the first music (No. 0) over the eighth music (No. 7).

In the example embodiment described above, the information recorded in the log 121, and particularly the current time data and the information related to the input event generated by the visitor at the client terminal 13-i, may be used to analyze the visits made by the visitors in the Web server 12 using the application 122. However, the current time data and the information related to the input event recorded in the log 121 may be used by the client terminal 13-i, for example.

The Web site 120 may provide a function of creating and editing images and/or documents, to create drawings, compose music, and create models, illustrations and designs in two or three dimensions. In this case, a user (creator or designer) may access the Web site 120 to create and edit the target document, for example, from any client terminal capable of accessing the Web server 12. Because the operations performed on the target document from any client terminal are recorded in the log 121 together with each access, the user may confirm the most recent editing made with respect to the target document by accessing the log 121, regardless of whether the client terminal that made the most recent editing and the client terminal that is making this confirmation are the same or are different. Further, if the user makes an erroneous operation on the target document, the second most recent editing made with respect to the target document may be retrieved from the log 121 in order to make the necessary correction. The user may retrieve the desired information on the target document from the log 121 by sorting the information recorded in the log 121 by the IP address of the user and/or the name or the like identifying the target document. As a result, the editing history of the target document may be acquired from the log 121, and it may be unnecessary to simultaneously store identical editing information on the target document at each of the possible client terminals from which the user may edit the target document, in a synchronized manner, which may otherwise consume a considerably large amount of memory resources.

Figure 17:
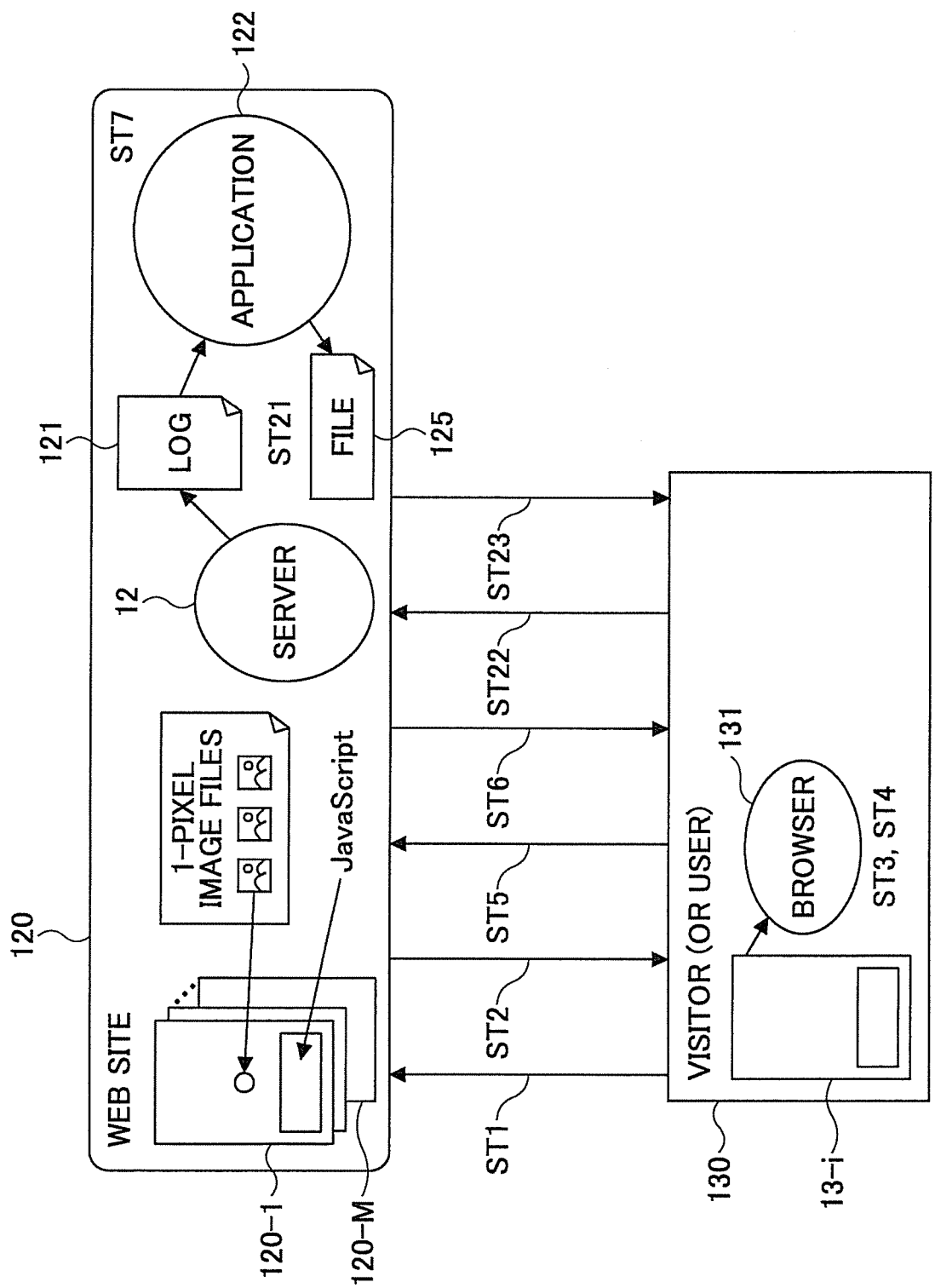
FIG. 17 is a diagram for explaining a retrieval of log information from the Web site.

FIG. 17 is a diagram for explaining a retrieval of log information from the Web site. In FIG. 17, those example parts that are the same as those corresponding example parts in FIG. 5 are designated by the same reference numerals, and a description thereof will be omitted. In FIG. 17, it is assumed for the sake of convenience that the Web site 120 has the function of creating and editing drawings and documents.

In FIG. 17, the input events generated by the user at the client terminal 13-i and related to the steps ST5 and ST6 include inputs, modifications and editing performed on the drawing or document that is created. In addition, when the application 122 analyzes the log 121 in the step ST7, the application 122 writes to a file 125 for each IP address of the user and/or the name or the like identifying the target drawing or document, in a step ST21. One such file 125 may be created for each user and/or each target drawing or document, as an image file or a JSONP file.

In a step ST22, the user requests the file 125 to the Web server 12, based on the IP address of the user and/or the target drawing or document. In a step ST23, the Web server 12 sends the requested file 125 to the client terminal 13-*i*. Hence, the user may acquire the editing history of the target drawing or document from the file 125, extracted from the log 121 at the Web server 12. The user may use the editing history to further edit, modify or correct the target drawing or document.

Figure 18:
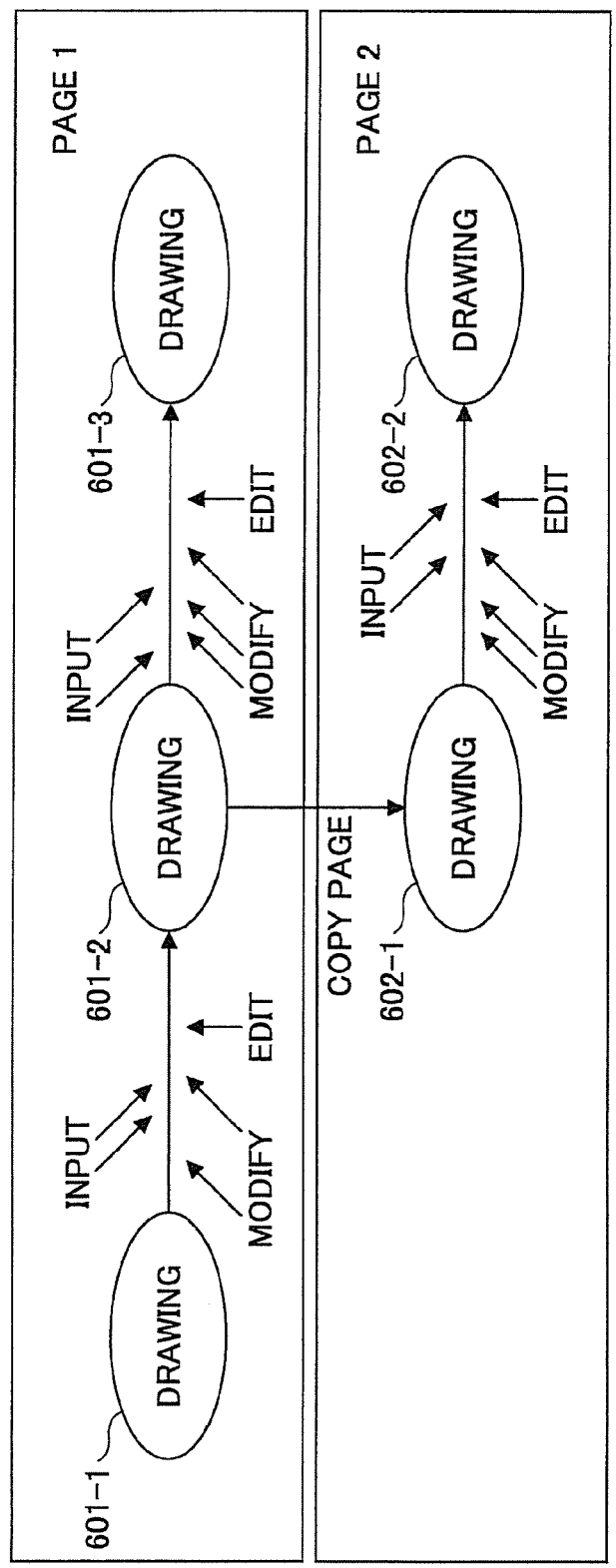
FIG. 18 is a diagram for explaining creation of drawings.

FIG. 18 is a diagram for explaining creation of drawings. FIG. 18 illustrates a case where drawings 601-1, 601-2 and 601-3 are time-sequentially created on page 1 by operations, such as input, modify or edit, made by the user from an arbitrary client terminal. Each operation may be made from an arbitrary client terminal. Further, a drawing 602-1 in page 2 is copied from the drawing 601-2 of page 1, and a drawing 602-2 is time-sequentially created on page 2 by operations made by the user from an arbitrary client terminal. The editing history included in the file 125 enables the user to understand the process of creating the drawings 601-1 through 601-3, 602-1 and 602-2 illustrated in FIG. 18.

Figure 19:
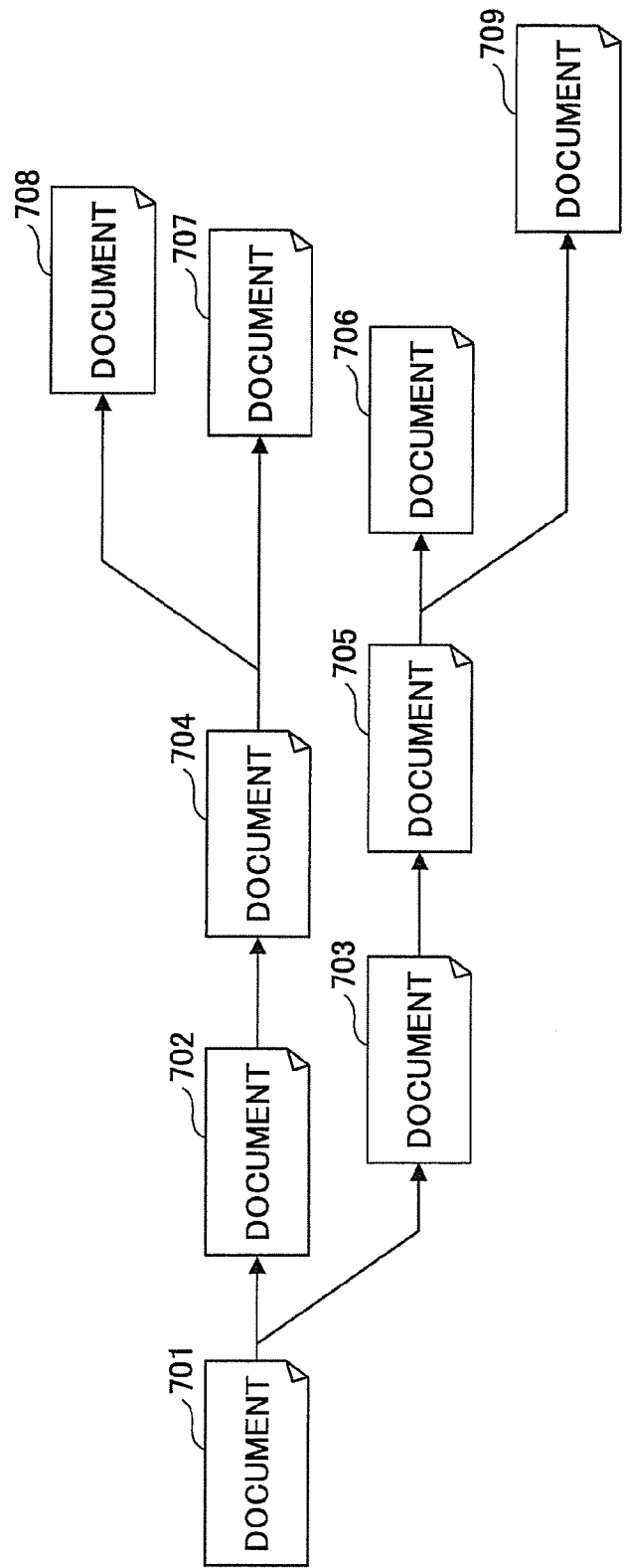
FIG. 19 is a diagram for explaining creation of documents.

FIG. 19 is a diagram for explaining creation of documents. FIG. 19 illustrates a case where documents 701 through 709 are time-sequentially created by operations made by the user from an arbitrary client terminal. Each operation may be made from an arbitrary client terminal. The editing history included in the file 125 enables the user to understand the process of creating the documents 701 through 709 illustrated in FIG. 19. For example, it may be found from the editing history that the document 709 is created from the document 705.

Figure 20:
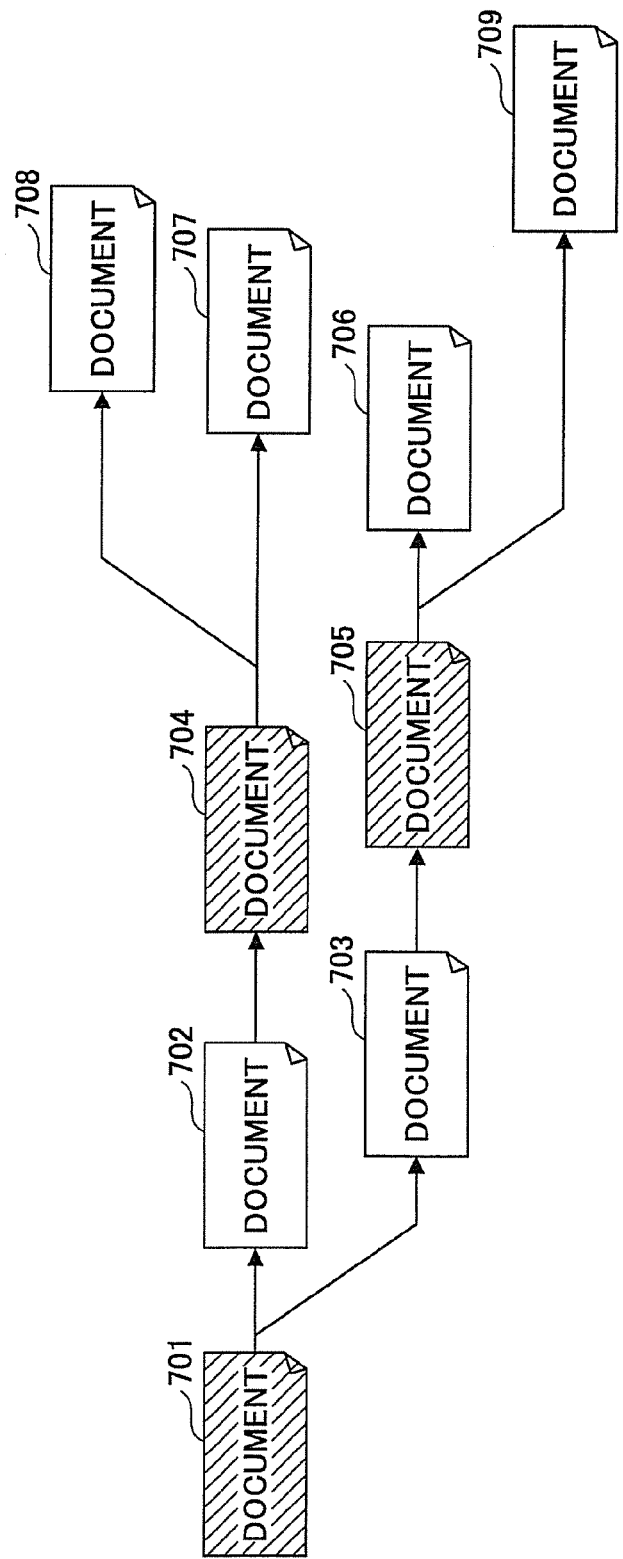
FIG. 20 is a diagram for explaining key frames, all arranged in accordance with the present disclosure.

FIG. 20 is a diagram for explaining key frames. In FIG. 20, those example parts that are the same as those corresponding example parts in FIG. 19 are designated by the same reference numerals, and a description thereof will be omitted.

In FIG. 20, a root document in the tree structure of the documents 701 through 709 is indicated by hatchings. The root document from which two or more document branch, is regarded as a key frame. By including, in the file 125, information indicating that the documents 701, 704 and 705 are key frames, the user may easily back-trace the tree structure in order to acquire the desired document in the tree structure.

The log 121 stores causality of operations associated with the access and made by the user and accurately reflects such operations. Accordingly, the application 122 may restore the causality of the operations associated with the access made by the visitor at the Web site 120, from the log 121, even if the recording order in the log 121 does not guarantee the causality. The application 122 may reconstruct the operations associated with the access made by the user at the Web site 120 if the random parameter added to the single-pixel image file in the request for the single-pixel image file further includes information necessary to reconstruct the operations associated with the access made by the user. Therefore, the file 125 may be written with the information necessary to reconstruct the operations associated with the access made by the user, so that the causality is guaranteed in the editing history.

In some examples, the browser is configured to execute JavaScript by dynamically embedding a single-pixel image file (1-pixel image file) that is dynamically added with a random parameter to a source of a <img> tag element in a <div> tag element. However, in some examples, a two-pixel image file (2-pixel image file) or a three-pixel image file (3-pixel image file) may be used in place of the single-pixel image file.

Figure 21:
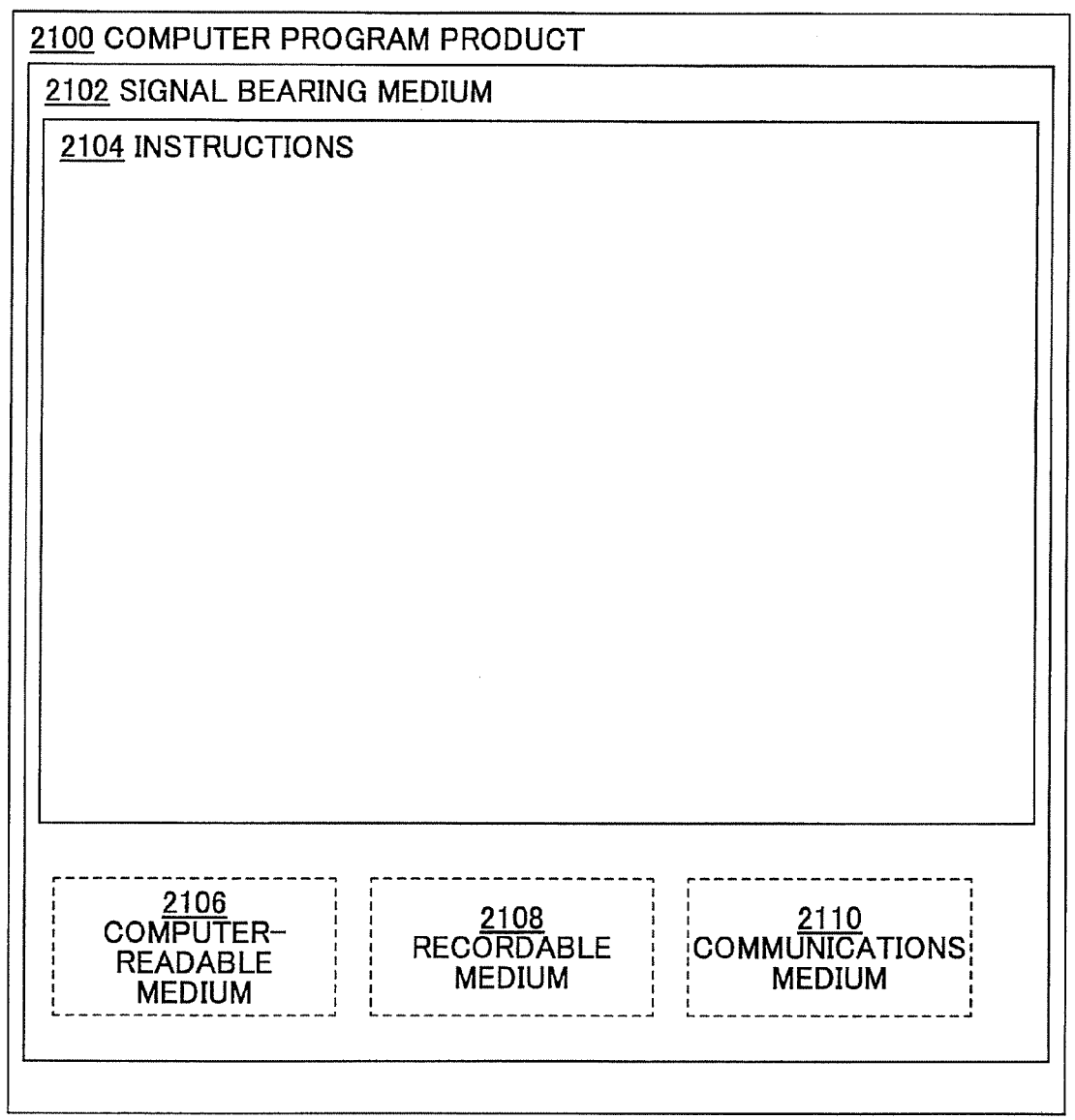
FIG. 21 is a block diagram illustrating an example computer program product.

FIG. 21 illustrates a block diagram of an example computer program product 2100. In some examples, as illustrated in FIG. 21, the computer program product 2100 includes a signal bearing medium 2102 that may also include instructions 2104 for causing the computer to perform a browser process to access a server providing a Web site and to include a function of recording access logs using Web beacon technology. The browser process may include a procedure to cause the computer to execute JavaScript to dynamically embed a single-pixel image file that is dynamically added with a random parameter to a source of a <img> tag element in a <div> tag element, where the random parameter may include at least current time data acquired in the information processing apparatus. The browser process may include a procedure to cause the computer to send a request for the single-pixel image file to the server each time an input event is generated in the information processing apparatus.

Also depicted in FIG. 21, in some examples, the computer product 2100 may include one or more of a computer-readable medium 2106, a recordable medium 2108 and a communications medium 2110. The dotted boxes around these elements depict different types of mediums included within, but not limited to, the signal bearing medium 2102. These types of mediums may distribute the instructions 2104 to be executed by logic. The computer-readable medium 2106 and the recordable medium 2108 may include, but are not limited to, a flexible disk, a hard disk drive (HDD), a Compact Disc (CD), a Digital Versatile Disk (DVD), a digital tape, a computer memory, etc. The communications medium 610 may include, but is not limited to, a digital and/or an analog communication medium (e.g., a fiber optic cable, a waveguide, a wired communication link, a wireless communication link, etc.).

Figure 22:
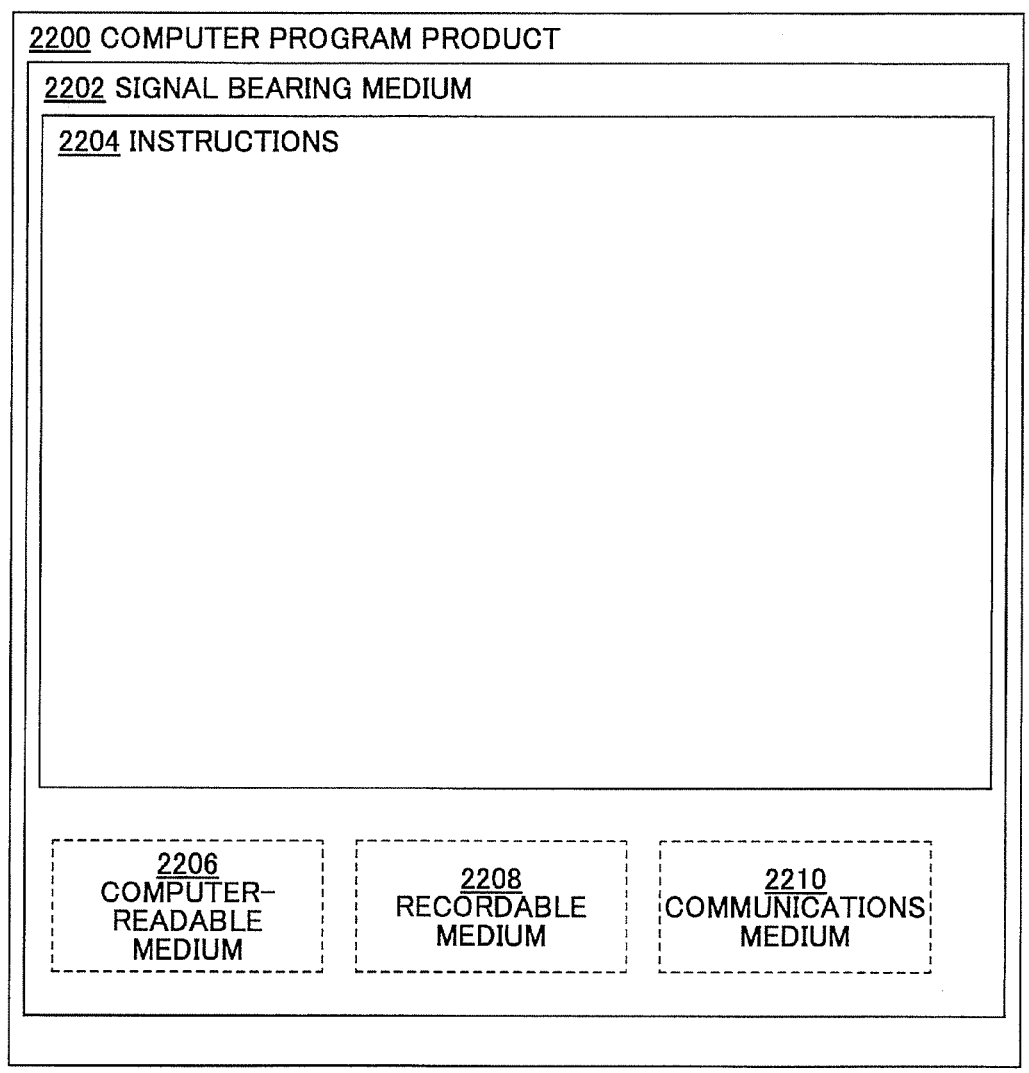
FIG. 22 is a block diagram illustrating another example computer program product.

FIG. 22 illustrates a block diagram of an example computer program product 2200. In some examples, as illustrated in FIG. 22, the computer program product 2200 includes a signal bearing medium 2102 that may also include instructions 2204 for causing the computer to perform a server process that provides a Web site and records access logs using Web beacon technology. The server process may include a procedure to cause the computer to read a single-pixel image file from the Web site and transfer the read single-pixel image file in HTML to the client terminal in response to a request for the single-pixel image file received responsive to an input event generated in the client terminal. The server process may include a procedure to cause the computer to record a log of the access made from the client terminal using Web beacon technology, substantially simultaneous to the transfer of the read single-pixel image file in HTML to the client terminal. The request for the single-pixel image file received from the client terminal may be dynamically embedded with the single-pixel image file that is dynamically added with a random parameter to a source of a <img> tag element in a <div> tag element by executing JavaScript. The random parameter may include at least current time data acquired in the client terminal. The log may include the random parameter added to the single-pixel image file in the request for the single-pixel image file, in addition to information recordable by the Web beacon technology.

Also depicted in FIG. 22, in some examples, computer product 2200 may include one or more of a computer-readable medium 2206, a recordable medium 2108 and a communications medium 2210. The dotted boxes around these elements depict different types of mediums included within, but not limited to, the signal bearing medium 2202. These types of mediums may distribute the instructions 2204 to be executed by logic. The computer-readable medium 2206 and the recordable medium 2108 may include, but are not limited to, a flexible disk, an HDD, a CD, a DVD, a digital tape, a computer memory, etc. The communications medium 610 may include, but is not limited to, a digital and/or an analog communication medium.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A server-client system comprising:
   a server configured to:
      provide a Web site, and
      record access logs using Web beacon technology; and
   a client terminal communicable with the server via a network and including a browser configured to execute JavaScript by dynamically embedding a single-pixel image file that is dynamically added with a random parameter to a source of a <img> tag element in a <div> tag element,
   wherein the random parameter includes current time data acquired in the client terminal,
   wherein the browser makes a request for the single-pixel image file to the server by a GET command responsive to an input event generated from the client terminal,
   wherein the server reads the requested single-pixel image file from the Web site, transfers the read single-pixel image file in HTML to the client terminal, and concurrently records a log of the access made from the client terminal, wherein the log to be recorded at the server includes the random parameter added to the single-pixel image file in the request for the single-pixel image file, in addition to information recordable by the Web beacon technology, and wherein the random parameter further includes information to reconstruct input events associated with the access made at the client terminal and guarantees causality of the input events, the information including a key-down in which a character string is input from an input device.

2. The server-client system as claimed in claim 1, wherein the information recordable by the Web beacon technology includes an IP address of the client terminal, a domain name of the client terminal, an access date and time acquired in the server, an access page name or a referrer, and the current time data is in units of milliseconds or less, and the time acquired in the server is in units of seconds.

3. The server-client system as claimed in claim 1, wherein the server includes an application configured to analyze the log.

4. The server-client system as claimed in claim 1, wherein the server is formed by an Apache HTTP server.

5. An information processing apparatus communicable with a server that provides a Web site and includes a function of recording access logs using Web beacon technology, comprising:

a storage unit configured to store a browser program; and a processor configured to execute the browser program stored in the storage unit in order to provide a browser function, wherein the browser function is configured to:

execute JavaScript by dynamically embedding a single-pixel image file that is dynamically added with a random parameter to a source of a <img> tag element in a <div> tag element, the random parameter including current time data acquired in the information processing apparatus and information to reconstruct input events associated with the access made in the information processing apparatus and guarantees causality of the input events based on the current time data, the information including a key-down in which a character string is input from an input device; and forward a request for the single-pixel image file to the server when an input event is generated in the information processing apparatus.

6. The information processing apparatus as claimed in claim 5, further comprising:

an input device; and a display unit, wherein the information to reconstruct input events associated with the access made in the information processing apparatus includes a mouse-click in which a coordinate or a line segment is graphically input from the input device, a button-click in which a button displayed on the display unit is clicked responsive to input to the input device to execute a process, a check-box-click in which a check box displayed on the display unit is clicked responsive to input to the input device to set a processing mode, and a radio-button-click in which a radio button displayed on the display unit is clicked responsive to input to the input device to select a color or a mode.

7. The information processing apparatus as claimed in claim 5, wherein the current time data is in units of milliseconds or less.

8. An information processing apparatus communicable with a client terminal, comprising:

a storage unit configured to store a server program and a log; and a processor configured to execute the server program stored in the storage unit in order to provide a server function, wherein the server function that is configured to:

provide a Web site;

read a single-pixel image file from the Web site and to transfer the read single-pixel image file in HTML to the client terminal in response to a request for the single-pixel image file received responsive to an input event generated in the client terminal; and record a log of the access made from the client terminal using Web beacon technology, substantially simultaneous to the transfer of the read single-pixel image file in HTML to the client terminal, wherein the request for the single-pixel image file received from the client terminal is dynamically embedded with the single-pixel image file that is dynamically added with a random parameter to a source of a <img> tag element in a <div> tag element by executing JavaScript, wherein the random parameter includes current time data acquired in the client terminal, wherein the log includes the random parameter added to the single-pixel image file in the request for the single-pixel image file, in addition to information recordable by the Web beacon technology, and wherein the random parameter further includes information to reconstruct input events associated with the access made at the client terminal and guarantees causality of the input events, the information including a key-down in which a character string is input from an input device.

9. The information processing apparatus as claimed in claim 8, wherein the information recordable by the Web beacon technology includes an IP address of the client terminal, a domain name of the client terminal, an access date and time acquired in the server, an access page name or a referrer.

10. The information processing apparatus as claimed in claim 8, wherein the storage unit stores an application program, and the processor executes the application program stored in the storage unit in order to provide an analyzing function to analyze the log.

11. The information processing apparatus as claimed in claim 10, wherein the analyzing function further includes sorting the information of the log based on at least one of the current time data, an IP address of the client terminal, information identifying a target document or drawing created and edited on the Web site.

12. The information processing apparatus as claimed in claim 8, wherein the storage unit and the processor form an Apache HTTP server.

13. A computer program product comprising a non-transitory computer-readable storage medium having stored therein a program which, when executed by a computer, causes the computer to perform a browser process to access a sever providing a Web site and to include a function of recording access logs using Web beacon technology, the browser process comprising:

executing JavaScript to dynamically embed a single-pixel image file that is dynamically added with a random parameter to a source of a <img> tag element in a <div> tag element, the random parameter including current time data acquired in the information processing apparatus and information to reconstruct input events associated with the access made in the information processing apparatus and guarantees causality of the input events based on the current time data the information including a key-down in which a character string is input from an input device; and sending a request for the single-pixel image file to the server responsive to an input event generated in the information processing apparatus.

14. A computer program product comprising a non-transitory computer-readable storage medium having stored therein a program which, when executed by a computer, causes the computer to perform a server process to provide a Web site and to record access logs using Web beacon technology, the server process comprising:

reading a single-pixel image file from the Web site and transferring the read single-pixel image file in HTML to the client terminal in response to a request for the single-pixel image file received responsive to an input event generated in the client terminal; and recording a log of the access made from the client terminal using Web beacon technology, substantially simultaneous to the transfer of the read single-pixel image file in HTML to the client terminal, wherein the request for the single-pixel image file received from the client terminal is dynamically embedded with the single-pixel image file that is dynamically added with a random parameter to a source of a <img> tag element in a <div> tag element by executing JavaScript, wherein the random parameter includes current time data acquired in the client terminal, wherein the log includes the random parameter added to the single-pixel image file in the request for the single-pixel image file, in addition to information recordable by the Web beacon technology, and wherein the random parameter further includes information to reconstruct input events associated with the access made at the client terminal and guarantees causality of the input events, the information including a key-down in which a character string is input from an input device.

15. The computer program product as claimed in claim 14, wherein the server process causes the computer to function as an Apache HTTP server.

16. An information processing apparatus communicable with a server that provides a Web site and includes a function of recording access logs using Web beacon technology, comprising:

a storage unit configured to store a browser program; and a processor configured to execute the browser program stored in the storage unit in order to provide a browser function, wherein the browser function is configured to execute JavaScript by dynamically embedding a single-pixel image file that is dynamically added with a random parameter to a source of a <img> tag element in a <div> tag element, and wherein the random parameter includes current time data acquired in the information processing apparatus and information to reconstruct input event associated with the access made in the information processing apparatus and guarantees causality of the input events based on the current time data.

* * * * *

UNITED STATES PATENT AND TRADEMARK OFFICE
CERTIFICATE OF CORRECTION

| | |
|---|---|
| PATENT NO. | : 8,990,291 B2 |
| APPLICATION NO. | : 12/993465 |
| DATED | : March 24, 2015 |
| INVENTOR(S) | : Ueda |

Page 1 of 2

It is certified that error appears in the above-identified patent and that said Letters Patent is hereby corrected as shown below:

In the Specification

In Column 1, below Title, insert -- CROSS-REFERENCE TO RELATED APPLICATION
The present application is a U.S. national stage filing under 35 U.S.C. §371 of International Application No. PCT/JP2010/004683, filed on Jul. 21, 2011. --.

In Column 3, Line 56, delete "DESCRIPTION" and insert -- DETAILED DESCRIPTION --, therefor.

In Column 10, Line 64, delete "client terminal 12-i" and insert -- client terminal 13-i --, therefor.

In Column 10, Line 66, delete "client terminal 12-i." and insert -- client terminal 13-i. --, therefor.

In Column 11, Line 2, delete "terminal 12-i" and insert -- terminal 13-i --, therefor.

In Column 15, Line 9, delete ""v-img.tag"." and insert -- "varimg.tag". --, therefor.

In Column 18, Line 57, delete "medium 2108" and insert -- medium 2208 --, therefor.

In the Claims

In Column 21, Line 15, in Claim 2, delete "wherein" and insert -- wherein: --, therefor.

In Column 21, Line 15, in Claim 2, delete "wherein" and insert -- wherein: --, therefor.

In Column 22, Line 62, in Claim 13, delete "sever" and insert -- server --, therefor.

In Column 23, Line 6, in Claim 13, delete "data" and insert -- data, --, therefor.

Signed and Sealed this
Eleventh Day of August, 2015

Michelle K. Lee
*Director of the United States Patent and Trademark Office*

CERTIFICATE OF CORRECTION (continued)
U.S. Pat. No. 8,990,291 B2

In Column 24, Line 29, in Claim 16, delete "event" and insert -- events --, therefor.

In Column 24, Line 32, in Claim 16, delete "data." and insert -- data, the information including a key-down in which a character string is input from an input device. --, therefor.